US012738470B2

(12) United States Patent
Stella et al.

(10) Patent No.: US 12,738,470 B2
(45) Date of Patent: Sep. 15, 2026

(54) ULTRA HIGH THROUGHPUT SCREENING COMBINED WITH DEFINITIVE TESTING IN A SINGLE SAMPLE PREPARATION STEP

(71) Applicant: DH TECHNOLOGIES DEVELOPMENT PTE. LTD., Singapore (SG)

(72) Inventors: Aaron Stella, Derry, NH (US); Michal Weinstock, Newton, MA (US); Yongquan Lai, Cambridge, MA (US); Subhasish Purkayastha, Framingham, MA (US); Scott Daniels, Northampton, MA (US)

(73) Assignee: DH Technologies Development Pte. Ltd., Singapore (SG)

( * ) Notice: Subject to any disclaimer, the term of this patent is extended or adjusted under 35 U.S.C. 154(b) by 314 days.

(21) Appl. No.: 18/704,242

(22) PCT Filed: Oct. 26, 2022

(86) PCT No.: PCT/IB2022/060304
§ 371 (c)(1),
(2) Date: Apr. 24, 2024

(87) PCT Pub. No.: WO2023/073587
PCT Pub. Date: May 4, 2023

(65) Prior Publication Data

US 2024/0420939 A1 Dec. 19, 2024

Related U.S. Application Data

(60) Provisional application No. 63/274,352, filed on Nov. 1, 2021.

(51) Int. Cl.
*H01J 49/04* (2006.01)
*H01J 49/00* (2006.01)

(52) U.S. Cl.
CPC ...... *H01J 49/0404* (2013.01); *H01J 49/0031* (2013.01); *H01J 49/004* (2013.01); *H01J 49/0454* (2013.01)

(58) Field of Classification Search
CPC .... H01J 49/0404; H01J 49/0031; H01J 49/04; H01J 49/0454
See application file for complete search history.

(56) References Cited

U.S. PATENT DOCUMENTS

2019/0157061 A1 5/2019 Datwani et al.
2020/0279725 A1 * 9/2020 Le Blanc .............. H01J 49/004
(Continued)

FOREIGN PATENT DOCUMENTS

WO 2012/090046 7/2012

OTHER PUBLICATIONS

International Search Report and Written Opinion corresponding to International Patent Application No. PCT/IB2022/060304, mailed Jan. 20, 2023.

(Continued)

*Primary Examiner* — Nicole M Ippolito
(74) *Attorney, Agent, or Firm* — Lathrop GPM LLP; Malaika O.D. Tyson; Jason Kuchar

(57) ABSTRACT

The presently claimed and described technology provides a sample processing system comprising at least one sample introduction device, wherein the at least one sample introduction device is configured to receive a sample; a mass analyzer coupled to the sample introduction device; a control system configured to at least control the at least one sample introduction device and/or the mass analyzer, wherein the mass analyzer is configured to perform a first mass analysis on the sample, wherein the first mass analysis is mass screening for an analyte of interest in the sample, and wherein if the analyte of interest is detected in the sample, (Continued)

the mass analyzer is configured to perform a second mass analysis, wherein the second mass analysis is a quantitative analysis, comprising: ionizing the sample; monitoring, by mass spectrometry, at least one product ion transition for the at least one analyte and at least one isotopic ion transition for the at least one analyte; determining intensity and/or abundance of the at least one product ion transition and/or the at least one isotopic ion transition; and quantifying the at least one analyte present in the sample using the intensity and/or abundance of the at least one product ion transition and/or isotopic ion transition.

20 Claims, 20 Drawing Sheets

(56) References Cited

U.S. PATENT DOCUMENTS

2021/0296105 A1 9/2021 Ukai et al.
2022/0099637 A1* 3/2022 Gu .................... G01N 30/7233
2024/0297028 A1* 9/2024 Daniels ................ G06F 3/0484

OTHER PUBLICATIONS

Sosnowski Piotr et al, "Application of 3D printed tools for customized open port probe-electrospray mass spectrometry", Mar. 12, 2020 (Mar. 12, 2020), vol. 215, XP086136954.
Sosnowski Piotr et al, "Supplementary Data Application of 3D Printed Tools for Customized Open Port Probe-Electrospray Mass Spectrometry Contents", Amsterdam, NL Mar. 12, 2020 (Mar. 12, 2020), p. 1-15, Retrieved from the Internet: URL:https://ars.els-cdn.com/content/image/1-s2.0-S0039914020301855-mmc2.pdf, XP093013519.
Zhang Hui et al, "Acoustic Ejection Mass Spectrometry for High-Throughput Analysis", US Jul. 28, 2021 (Jul. 28, 2021), vol. 93, No. 31, p. 10850-10861, Retrieved from the Internet: URL:https://pubs.acs.org/doi/pdf/10.1021/acs.analchem.1c01137, XP093004943.
PCT, "International Preliminary Report on Patentability," corresponding to International Patent Application No. PCT/IB2022/060304, 7 pages, mailed May 16, 2024.

* cited by examiner

SAMPLE PROCESSING SYSTEM

FIG. 12
Fentanyl
336.48 Da
Fentanyl isotopic MRM
340.23/190.15 (980.3x dilution factor)
Fentanyl-d5 isotopic MRM
344.24/190.15 (986.9x dilution factor)
Norfentanyl isotopic MRM
234.17/85.08 (17x dilution factor)
Norfentanyl-d5 isotopic MRM
239.18/85.08 (17x dilution factor)
Norfentanyl
232.33 Da

Fentanyl

| Cal # | Mass Q1 | Mass Q3 | Abund Expected | Expected Conc | Dilution (IDF) |
|---|---|---|---|---|---|
| 1 | 337.23 | 188.14 | 100.000% | 1000.0 ng/mL | |
| 2 | 338.23 | 189.15 | 14.633% | 146.3 ng/mL | 6.8 |
| 3 | 338.23 | 188.14 | 10.264% | 102.6 ng/mL | 9.7 |
| 4 | 339.23 | 189.15 | 1.502% | 15.0 ng/mL | 66.6 |
| 5 | 339.23 | 190.15 | 0.994% | 9.9 ng/mL | 100.6 |
| 6 | 339.23 | 188.14 | 0.679% | 6.8 ng/mL | 147.3 |
| 7 | 340.23 | 190.15 | 0.102% | 1.0 ng/mL | 980.3 |
| 8 | 340.23 | 189.15 | 0.099% | 1.0 ng/mL | 1006.6 |
| 9 | 340.23 | 191.15 | 0.042% | 0.4 ng/mL | 2407.1 |
| 10 | 340.23 | 188.14 | 0.034% | 0.3 ng/mL | 2946.0 |
| 11 | 341.24 | 190.15 | 0.007% | 0.1 ng/mL | 14819.7 |

FIG. 15A

Traditional MRM

Isotopic MRM

Fentanyl-d5

| IS # | Mass Q1 | Mass Q3 | Abund Expected | Expected Conc | Dilution (IDF) |
|---|---|---|---|---|---|
| 1 | 341.23 | 188.14 | 100.000% | 200.0 ng/mL | |
| 2 | 342.23 | 189.15 | 14.633% | 29.3 ng/mL | 6.8 |
| 3 | 342.23 | 188.14 | 10.195% | 20.4 ng/mL | 9.8 |
| 4 | 343.24 | 189.15 | 1.492% | 3.0 ng/mL | 67.0 |
| 5 | 343.24 | 190.15 | 0.994% | 2.0 ng/mL | 100.6 |
| 6 | 343.24 | 188.14 | 0.672% | 1.3 ng/mL | 148.8 |
| 7 | 344.24 | 190.15 | 0.101% | 0.2 ng/mL | 986.9 |
| 8 | 344.24 | 189.15 | 0.098% | 0.2 ng/mL | 1017.1 |
| 9 | 344.24 | 191.15 | 0.042% | 0.1 ng/mL | 2407.1 |
| 10 | 344.24 | 188.14 | 0.033% | 0.1 ng/mL | 2986.9 |
| 11 | 345.24 | 190.15 | 0.007% | 0.0 ng/mL | 14975.3 |

FIG. 15B

Fentanyl

Fentanyl-d5

Norfentanyl

Norfentanyl-d5

Fentanyl 1.50

| Name | Calculated | Actual | Accuracy % |
|---|---|---|---|
| CS cal 1 | 5.2 | 4.96 | 104.96 |
| CS cal 2 | 8.4 | 7.61 | 109.85 |
| CS cal 3 | 17 | 18.5 | 91.91 |
| CS cal 4 | 36 | 37.2 | 96.86 |
| CS cal 5 | 58.2 | 64.6 | 90.04 |
| CS cal 6 | 135.1 | 127 | 106.38 |
| BLANK | 1.3 | N/A | N/A |
| CS QC 1 | 9.7 | 9.93 | 97.19 |
| CS QC 2 | 26.9 | 29 | 92.82 |
| CS QC 3 | 95.5 | 105 | 90.91 |

FIG. 17A

Norfentanyl 5.89

| Name | Calculated | Actual | Accuracy % |
|---|---|---|---|
| CS cal 1 | 5.4 | 5.93 | 90.22 |
| CS cal 2 | 9.9 | 9.27 | 106.8 |
| CS cal 3 | 24.2 | 23.8 | 101.59 |
| CS cal 4 | 52.5 | 49.1 | 106.85 |
| CS cal 5 | 82.4 | 88.1 | 93.57 |
| CS cal 6 | 195.9 | 194 | 100.96 |
| BLANK | < 0 | N/A | N/A |
| CS QC 1 | 11.3 | 11.9 | 94.86 |
| CS QC 2 | 35.7 | 36.4 | 97.99 |
| CS QC 3 | 135.6 | 139 | 97.53 |

FIG. 17B

ULTRA HIGH THROUGHPUT SCREENING COMBINED WITH DEFINITIVE TESTING IN A SINGLE SAMPLE PREPARATION STEP

RELATED APPLICATIONS

The present application is filed pursuant to 35 U.S.C. 371 as a U.S. National Phase application of International Patent Application No. PCT/IB2022/060304, which was filed Oct. 26, 2022, claiming the priority benefit of U.S. Provisional Patent Application Ser. No. 63/274,352, filed Nov. 1, 2021, the content of each is hereby incorporated by reference in its entirety into this disclosure.

BACKGROUND

Analytical samples, including biological samples and bodily liquids, can often provide critical analytical information. Presently, compounds of a related group (i.e., drugs and metabolites, hormones in a pathway, biomarkers, and/or peptides from a particular biologic drug) are generally measured together. However, these samples often possess analytes of interest, metabolites, and biomarkers in concentration ranges that are orders of magnitude higher than other related compounds in a panel. This makes measuring and quantifying the entire panel difficult and often requires running two or more different assays for one sample.

Direct acoustic ionization mass spectrometry is suitable for high-throughput screening of samples, but because there is no separation (i.e., chromatography, ion mobility) performed on the sample that is ejected into the mass spectrometer, this workflow is not optimal for obtaining a specific, quantitative result (definitive testing). For example, when analyzing samples with analytes of varying concentrations, detector saturation may occur with higher concentrated analytes presenting a signal intensity that exceeds the detector capacity. Additionally, as direct acoustic ionization mass spectrometry requires concentrated samples, the samples must be prepared a second time after screening for quantification via definitive testing. Due to the required concentration differences between platforms, a dilution step would be necessary when transferring samples from a direct acoustic ionization mass spectrometry plate to an LC vial. This additional preparation is time-, reagent-, and vial-consuming, requires human intervention, and is prone to errors.

SUMMARY

The inventors have recognized the need to combine direct sampling from a container initially used for a first analysis, such as screening, with a quantitative mass analyzer. Relative quantification of an analyte using a quantitative mass analyzer typically requires labeling the analyte (or sample) with an isotopic, isobaric, or metal tag. However, label-free quantification using multiple reaction monitoring (MRM) of natural isotopic abundance enables high throughput quantitative analysis without any physical dilution.

One aspect of the disclosure relates to a sample processing system comprising at least one sample introduction device, wherein the at least one sample introduction device is configured to receive a sample; a mass analyzer coupled to the sample introduction device; a control system configured to at least control the at least one sample introduction device and/or the mass analyzer, wherein the mass analyzer is configured to perform a first mass analysis on the sample, wherein the first mass analysis is mass screening for an analyte of interest in the sample, and wherein if the analyte of interest is detected in the sample, the mass analyzer is configured to perform a second mass analysis, wherein the second mass analysis is a quantitative analysis, comprising: ionizing the sample; monitoring, by mass spectrometry, at least one product ion transition for the at least one analyte and at least one isotopic ion transition for the at least one analyte; determining intensity and/or abundance of the at least one product ion transition and/or the at least one isotopic ion transition; and quantifying the at least one analyte present in the sample using the intensity and/or abundance of the at least one product ion transition and/or isotopic ion transition.

In an aspect, the product ion transition has an intensity and/or abundance of about 100%. In another aspect, the product ion transition is the most intense and/or abundant isotope of the at least one analyte. In another aspect, the intensity and/or abundance of the isotopic ion transition is less than about 100%, alternatively less than about 50%, alternatively less than about 25%, alternatively less than about 15%, alternatively less than about 10%, alternatively less than about 5% than a precursor and/or the product ion transition. In yet another aspect, determining the intensity and/or abundance of the at least one product ion transition and/or isotopic ion transition comprises obtaining mass data corresponding to the at least one product ion transition and/or isotopic ion transition.

In an aspect, at least two analytes are quantified, alternatively at least three analytes are quantified, alternatively at least four analytes are quantified, alternatively at least five analytes are quantified, alternatively at least six analytes are quantified, alternatively at least seven analytes are quantified, alternatively at least eight analytes are quantified, alternatively at least nine analytes are quantified, alternatively at least ten analytes are quantified. In another aspect, at least two product ion transitions are monitored, alternatively at least three product ion transitions are monitored, alternatively at least four product ion transitions are monitored, alternatively at least five product ion transitions are monitored, alternatively at least six product ion transitions are monitored, alternatively at least seven product ion transitions are monitored, alternatively at least eight product ion transitions are monitored, alternatively at least nine precursor-product ion transitions are monitored, alternatively at least ten precursor-product ion transitions are monitored. In another aspect, at least two isotopic ion transitions are monitored, alternatively at least three isotopic ion transitions are monitored, alternatively at least four isotopic ion transitions are monitored, alternatively at least five isotopic ion transitions are monitored, alternatively at least six isotopic ion transitions are monitored, alternatively at least seven isotopic ion transitions are monitored, alternatively at least eight isotopic ion transitions are monitored, alternatively at least nine isotopic ion transitions are monitored, alternatively at least ten isotopic ion transitions are monitored. In another aspect, the sample processing system further comprises quantifying at least a second analyte in the sample using a product ion transition and/or isotopic ion transition of the second analyte. In another aspect, the control system comprises a non-transitory and tangible computer-readable storage medium is used to determine the intensity and/or abundance of the isotopic ion transition.

In an aspect, if the product ion transition meets a condition, selecting the most intense and/or abundant isotopic ion transition that does not meet the condition, and quantifying the at least one analyte present in the sample using the intensity and/or abundance of said isotopic ion transition. In another aspect, the condition is ionization saturation, detector saturation, product ions generated near a peak apex, peak shape, a threshold intensity and/or a threshold abundance.

In an aspect, quantifying the at least one analyte present in the sample comprises performing a separation step on the sample prior to ionization, using the intensity and/or abundance of the at least one product ion transition and/or the at least one isotopic ion transition to calculate a ratio of the at least one product ion transition and/or the at least one isotopic ion transition to the corresponding analyte and/or precursor, and quantifying the analyte in the sample using the calculated ratio. In another aspect, the calculated ratio is used to calculate an isotopic dilution factor (IDF). In a further aspect, the IDF is used as a multiplier to compensate for abundance differences between the product ion transition and/or isotopic ion transition and the corresponding analyte. In yet another aspect, the control system comprises a non-transitory and tangible computer-readable storage medium is used to calculate the ratio of the at least one product ion transition and/or isotopic ion transition to the corresponding analyte and/or the precursor, and/or quantifying the at least one analyte in the sample using the calculated ratio.

In an aspect, the sample introduction device comprises an acoustic droplet ejector (ADE), a solid phase extraction system, liquid-liquid extraction, protein precipitation, a liquid aspiration system, a microinjector, a nanoinjector, an inkjet printer nozzle, a chromatography instrument, microflow system, solid phase extraction system, differential mobility spectrometer, a trap-and-elute workflow, an open port interface, or direct flow injection. In another aspect, the sample introduction comprises acoustically ejecting the liquid sample into a mobile phase at an open port interface (OPI) using the acoustic droplet ejector (ADE). In another aspect, the chromatography instrument is a high performance liquid chromatography (HPLC) instrument, an ultra high performance liquid chromatography instrument (UPLC), Micro liquid chromatography, or Nano liquid chromatography.

In an aspect, the mass analyzer is a tandem mass spectrometer. In another aspect, the tandem mass spectrometer is selected from the group consisting of a triple quadrupole, a quadrupole-linear ion trap, a quadrupole TOF, and a TOF-TOF. In another aspect, the mass analyzer comprises a detector. In a further aspect, the detector is an ion detector. In yet a further aspect, the ion detector is selected from the group consisting of an electron multiplier, a Faraday cup, a photomultiplier conversion dynode detector, an array detector, and a charge detector.

In another aspect, the sample is a biological sample. In another aspect, the biological sample is selected from the group consisting of urine, blood, oral fluid, plasma, tissue, bone marrow, and tumor samples. In yet another aspect, the biological sample is dissolved in a solvent, introduced into a solution, or mixed with a matrix material.

In an aspect, quantifying the at least one analyte present in the sample is based on a calibration curve generated for at least one calibration standard. In another aspect, the calibration curve may be generated using at least one product ion transition, at least one isotopic ion transition, or a combination of both.

In another aspect, the sample processing system further comprises at least one sample preparation station configured to receive and/or prepare a sample; and at least one container, wherein the sample preparation station is configured to dispense the prepared sample into the at least one container. In another aspect, the sample processing system further comprises: at least one container transport device; sample introduction device is configured to receive the at least one container from the sample preparation station via the at least one container transport device. In yet another aspect, the sample processing system further comprises at least one aliquoting station, wherein the at least one aliquoting station is configured to aliquot a portion of the sample to and/or from the at least one container. In a further aspect, the at least one aliquoting station is housed in the sample preparation station or the at least one sample introduction device. In another aspect, the sample processing system comprises at least two aliquoting stations, wherein a first aliquoting station is housed in the sample preparation station and a second aliquoting station is housed in the at least one sample introduction device. In another aspect, the at least one container is at least one sample plate comprising a plurality of sample wells. In yet another aspect, the sample well comprises the sample.

Another aspect of the disclosure is a sample processing system comprising at least one sample introduction device, wherein the at least one sample introduction device is configured to receive a sample; a first mass analyzer coupled to the sample introduction device; wherein the first mass analyzer is configured to perform a first mass analysis of the sample, wherein the first mass analysis is a mass screening; a second mass analyzer; wherein if an analyte of interest is detected in the sample, the second mass analyzer is configured to perform a second mass analysis; ionizing the sample; monitoring, by mass spectrometry, at least one product ion transition for the at least one analyte and at least one isotopic ion transition for the at least one analyte; determining the intensity and/or abundance of the at least one product ion transition and/or the at least one isotopic ion transition; and quantifying the at least one analyte present in the sample using the intensity and/or abundance of the product ion transition and/or isotopic ion transition; and a control system configured to at least control the at least one sample introduction device, the first mass analyzer, and/or the second mass analyzer.

In an aspect, the product ion transition has an intensity and/or abundance of about 100%. In another aspect, the product ion transition is the most intense and/or abundant isotope of the at least one analyte. In another aspect, the intensity and/or abundance of the isotopic ion transition is less than about 100%, alternatively less than about 50%, alternatively less than about 25%, alternatively less than about 15%, alternatively less than about 10%, alternatively less than about 5% than a precursor and/or the product ion transition. In yet another aspect, determining the intensity and/or abundance of the product ion transition and/or isotopic ion transition comprises obtaining mass data corresponding to the product ion transition and/or isotopic ion transition.

In an aspect, at least two analytes are quantified, alternatively at least three analytes are quantified, alternatively at least four analytes are quantified, alternatively at least five analytes are quantified, alternatively at least six analytes are quantified, alternatively at least seven analytes are quantified, alternatively at least eight analytes are quantified, alternatively at least nine analytes are quantified, alternatively at least ten analytes are quantified. In another aspect, at least two product ion transitions are monitored, alternatively at least three product ion transitions are monitored, alternatively at least four product ion transitions are monitored, alternatively at least five product ion transitions are monitored, alternatively at least six product ion transitions are monitored, alternatively at least seven product ion transitions are monitored, alternatively at least eight product ion transitions are monitored, alternatively at least nine precursor-product ion transitions are monitored, alternatively at least ten precursor-product ion transitions are monitored. In another aspect, at least two isotopic ion transitions are monitored, alternatively at least three isotopic ion transitions are monitored, alternatively at least four isotopic ion transitions are monitored, alternatively at least five isotopic ion transitions are monitored, alternatively at least six isotopic ion transitions are monitored, alternatively at least seven isotopic ion transitions are monitored, alternatively at least eight isotopic ion transitions are monitored, alternatively at least nine isotopic ion transitions are monitored, alternatively at least ten isotopic ion transitions are monitored. In yet another aspect, the sample processing system further comprising quantifying at least a second analyte in the sample using a product ion transition and/or isotopic ion transition of the second analyte. In another aspect, the control system comprises a non-transitory and tangible computer-readable storage medium is used to determine the intensity and/or abundance of the isotopic ion transition.

In an aspect, if the product ion transition meets a condition, the sample processing system further comprises selecting the most intense and/or abundant isotopic ion transition that does not meet the condition, and quantifying the at least one analyte present in the sample using the intensity and/or abundance of said isotopic ion transition. In another aspect, the condition is ionization saturation, detector saturation, product ions generated near the peak apex, peak shape, a threshold intensity and/or a threshold abundance.

In an aspect, quantifying the at least one analyte present in the sample comprises performing a separation step on the sample prior to ionization, using the intensity and/or abundance of the at least one product ion transition and/or the at least one isotopic ion transition to calculate a ratio of the at least one product ion transition and/or the at least one isotopic ion transition to the corresponding analyte and/or precursor, and quantifying the analyte in the sample using the calculated ratio. In another aspect, the calculated ratio is used to calculate an isotopic dilution factor (IDF). In further aspect, the IDF is used as a multiplier to compensate for abundance differences between the product ion transition and/or isotopic ion transition and the corresponding analyte. In another aspect, the control system comprises a non-transitory and tangible computer-readable storage medium is used to calculate the ratio of the at least one product ion transition and/or isotopic ion transition to the corresponding analyte and/or the precursor, and/or quantifying the at least one analyte in the sample using the calculated ratio.

In an aspect, the sample introduction device comprises an acoustic droplet ejector (ADE), a solid phase extraction system, liquid-liquid extraction, protein precipitation, a liquid aspiration system, a microinjector, a nanoinjector, an inkjet printer nozzle, a chromatography instrument, microflow system, solid phase extraction system, differential mobility spectrometer, a trap-and-elute workflow, an open port interface, or direct flow injection. In another aspect, the sample introduction comprises acoustically ejecting the liquid sample into a mobile phase at an open port interface (OPI) using the acoustic droplet ejector (ADE). In another aspect, the chromatography instrument is a high performance liquid chromatography (HPLC) instrument, an ultra high performance liquid chromatography instrument (UPLC), Micro liquid chromatography, or Nano liquid chromatography.

In an aspect, the first mass analyzer is a single-stage mass spectrometer or a tandem mass spectrometer. In another aspect, the single-stage mass spectrometer is selected from the group consisting of magnetic sector, quadrupole, time-of-flight (TOF), and ion traps. In an aspect, the second mass analyzer is a tandem mass spectrometer. In another aspect, the tandem mass spectrometer is selected from the group consisting of a triple quadrupole, a quadrupole-linear ion trap, a quadrupole TOF, and a TOF-TOF.

In an aspect, the first and/or second mass analyzer comprises a detector. In another aspect, the detector is an ion detector. In another aspect, the ion detector is selected from the group consisting of an electron multiplier, a Faraday cup, a photomultiplier conversion dynode detector, an array detector, and a charge detector.

In an aspect, sample is a biological sample. In another aspect, the biological sample is selected from the group consisting of urine, blood, oral fluid, plasma, tissue, bone marrow, and tumor samples. In yet another aspect, the biological sample is dissolved in a solvent, introduced into a solution, or mixed with a matrix material.

In an aspect, quantifying the at least one analyte present in the sample is based on a calibration curve generated for at least one calibration standard. In another aspect, the calibration curve may be generated using at least one product ion transition, at least one isotopic ion transition, or a combination of both.

In an aspect, the sample processing system further comprises at least one sample preparation station configured to receive and/or prepare a sample; and at least one container, wherein the sample preparation station is configured to dispense the prepared sample into the at least one container.

In an aspect, the sample processing system further comprises at least one container transport device; sample introduction device is configured to receive the at least one container from the sample preparation station via the at least one container transport device. In another aspect, the sample processing system further comprises at least one aliquoting station, wherein the at least one aliquoting station is configured to aliquot a portion of the sample to and/or from the at least one container. In yet another aspect, the at least one aliquoting station is housed in the sample preparation station or the at least one sample introduction device. In another aspect, the sample processing system comprises at least two aliquoting stations, wherein a first aliquoting station is housed in the sample preparation station and a second aliquoting station is housed in the at least one sample introduction device. In a further aspect, the at least one container is at least one sample plate comprising a plurality of sample wells. In another aspect, the sample well comprises the sample.

Another aspect of the disclosure is a method for quantifying at least one analyte in a sample using a sample processing system, wherein the sample processing system comprises at least one sample introduction device, wherein the at least one sample introduction device is configured to receive a sample; a mass analyzer coupled to the sample introduction device; a control system configured to at least control the at least one sample introduction device and/or the mass analyzer, wherein the mass analyzer is configured to perform a first mass analysis on the sample, wherein the first mass analysis is mass screening for an analyte of interest in the sample, and wherein if the analyte of interest is detected in the sample, the mass analyzer is configured to perform a second mass analysis, wherein the second mass analysis is a quantitative analysis, comprising: ionizing the sample; monitoring, by mass spectrometry, at least one product ion transition for the at least one analyte and at least one isotopic ion transition for the at least one analyte; determining the intensity and/or abundance of the at least one product ion transition and/or the at least one isotopic ion transition; and quantifying the at least one analyte present in the sample using the intensity and/or abundance of the product ion transition and/or isotopic ion transition.

In an aspect, the product ion transition has an intensity and/or abundance of about 100%. In another aspect, the product ion transition is the most intense and/or abundant isotope of the at least one analyte. In another aspect, the intensity and/or abundance of the isotopic ion transition is less than about 100%, alternatively less than about 50%, alternatively less than about 25%, alternatively less than about 15%, alternatively less than about 10%, alternatively less than about 5% than a precursor and/or the product ion transition. In yet another aspect, determining the intensity and/or abundance of the product ion transition and/or isotopic ion transition comprises obtaining mass data corresponding to the product ion transition and/or isotopic ion transition.

In an aspect, at least two analytes are quantified, alternatively at least three analytes are quantified, alternatively at least four analytes are quantified, alternatively at least five analytes are quantified, alternatively at least six analytes are quantified, alternatively at least seven analytes are quantified, alternatively at least eight analytes are quantified, alternatively at least nine analytes are quantified, alternatively at least ten analytes are quantified. In another aspect, at least two product ion transitions are monitored, alternatively at least three product ion transitions are monitored, alternatively at least four product ion transitions are monitored, alternatively at least five product ion transitions are monitored, alternatively at least six product ion transitions are monitored, alternatively at least seven product ion transitions are monitored, alternatively at least eight product ion transitions are monitored, alternatively at least nine precursor-product ion transitions are monitored, alternatively at least ten precursor-product ion transitions are monitored. In yet another aspect, at least two isotopic ion transitions are monitored, alternatively at least three isotopic ion transitions are monitored, alternatively at least four isotopic ion transitions are monitored, alternatively at least five isotopic ion transitions are monitored, alternatively at least six isotopic ion transitions are monitored, alternatively at least seven isotopic ion transitions are monitored, alternatively at least eight isotopic ion transitions are monitored, alternatively at least nine isotopic ion transitions are monitored, alternatively at least ten isotopic ion transitions are monitored.

In another aspect, the method further comprises quantifying at least a second analyte in the sample using a product ion transition and/or isotopic ion transition of the second analyte. In another aspect, the control system comprises a non-transitory and tangible computer-readable storage medium is used to determine the intensity and/or abundance of the isotopic ion transition.

In an aspect, if the product ion transition meets a condition, selecting the most intense and/or abundant isotopic ion transition that does not meet the condition, and quantifying the at least one analyte present in the sample using the intensity and/or abundance of said isotopic ion transition. In another aspect, the condition is ionization saturation, detector saturation, product ions generated near a peak apex, peak shape, a threshold intensity and/or a threshold abundance.

In an aspect, quantifying the at least one analyte present in the sample comprises: performing a separation step on the sample prior to ionization, using the intensity and/or abundance of the at least one product ion transition and/or the at least one isotopic ion transition to calculate a ratio of the at least one product ion transition and/or the at least one isotopic ion transition to the corresponding analyte and/or precursor, and quantifying the analyte in the sample using the calculated ratio. In another aspect, the calculated ratio is used to calculate an isotopic dilution factor (IDF). In yet a further aspect, the IDF is used as a multiplier to compensate for abundance differences between the product ion transition and/or isotopic ion transition and the corresponding analyte. In another aspect, the control system comprises a non-transitory and tangible computer-readable storage medium is used to calculate the ratio of the at least one product ion transition and/or isotopic ion transition to the corresponding analyte and/or the precursor, and/or quantifying the at least one analyte in the sample using the calculated ratio.

In an aspect, the sample introduction device comprises an acoustic droplet ejector (ADE), a solid phase extraction system, liquid-liquid extraction, protein precipitation, a liquid aspiration system, a microinjector, a nanoinjector, an inkjet printer nozzle, a chromatography instrument, microflow system, solid phase extraction system, differential mobility spectrometer, a trap-and-elute workflow, an open port interface, or direct flow injection. In another aspect, the sample introduction comprises acoustically ejecting the liquid sample into a mobile phase at an open port interface (OPI) using the acoustic droplet ejector (ADE). In another aspect, the chromatography instrument is a high performance liquid chromatography (HPLC) instrument, an ultra high performance liquid chromatography instrument (UPLC), Micro liquid chromatography, or Nano liquid chromatography.

In an aspect, the mass analyzer is a tandem mass spectrometer. In another aspect, the tandem mass spectrometer is selected from the group consisting of a triple quadrupole, a quadrupole-linear ion trap, a quadrupole TOF, and a TOF-TOF. In another aspect, the mass analyzer comprises a detector. In another aspect, the detector is an ion detector. In a further aspect, the ion detector is selected from the group consisting of an electron multiplier, a Faraday cup, a photomultiplier conversion dynode detector, an array detector, and a charge detector.

In an aspect, the sample is a biological sample. In another aspect, the biological sample is selected from the group consisting of urine, blood, oral fluid, plasma, tissue, bone marrow, and tumor samples. In yet another aspect, the biological sample is dissolved in a solvent, introduced into a solution, or mixed with a matrix material.

In an aspect, quantifying the at least one analyte present in the sample is based on a calibration curve generated for at least one calibration standard. In another aspect, the calibration curve may be generated using at least one product ion transition, at least one isotopic ion transition, or a combination of both.

In an aspect, the sample processing system further comprises at least one sample preparation station configured to receive and/or prepare a sample; and at least one container, wherein the sample preparation station is configured to dispense the prepared sample into the at least one container. In another aspect, the sample processing system further comprises at least one container transport device; sample introduction device is configured to receive the at least one container from the sample preparation station via the at least one container transport device. In another aspect, the sample processing system further comprises at least one aliquoting station, wherein the at least one aliquoting station is configured to aliquot a portion of the sample to and/or from the at least one container. In yet another aspect, the at least one aliquoting station is housed in the sample preparation station or the at least one sample introduction device. In a further aspect, the sample processing system comprises at least two aliquoting stations, wherein a first aliquoting station is housed in the sample preparation station and a second aliquoting station is housed in the at least one sample introduction device. In another aspect, the at least one container is at least one sample plate comprising a plurality of sample wells. In a further aspect, the sample well comprises the sample.

In an aspect, the method is used in a clinical analysis workflow. In another aspect, the clinical analysis is used to screen for drugs of abuse or peptide markers for disease states. In a further aspect, the drugs of abuse are selected from the group consisting of amphetamines, methamphetamines, benzodiazepines, barbiturates, marijuana, cocaine, PCP, methadone, opioids (narcotics), fentanyl, norfentanyl, gabapentin, and pregabalin.

In an aspect, the method is used to extend the dynamic range of the mass analyzer. In another aspect, the method prevents reanalysis of the sample and/or allows for selective dilution of several analytes.

BRIEF DESCRIPTION OF THE DRAWINGS

Aspects of the present disclosure will now be described, by way of example only, with reference to the attached Figures, wherein:

FIGS. 15A and 15B show fentanyl and fentanyl-d5 isotopic MRM transitions monitored.

FIGS. 17A and 17B show definitive testing results for fentanyl (FIG. 17A) and norfentanyl (FIG. 17B) using isotopic MRMs.

DETAILED DESCRIPTION

Figure 1:
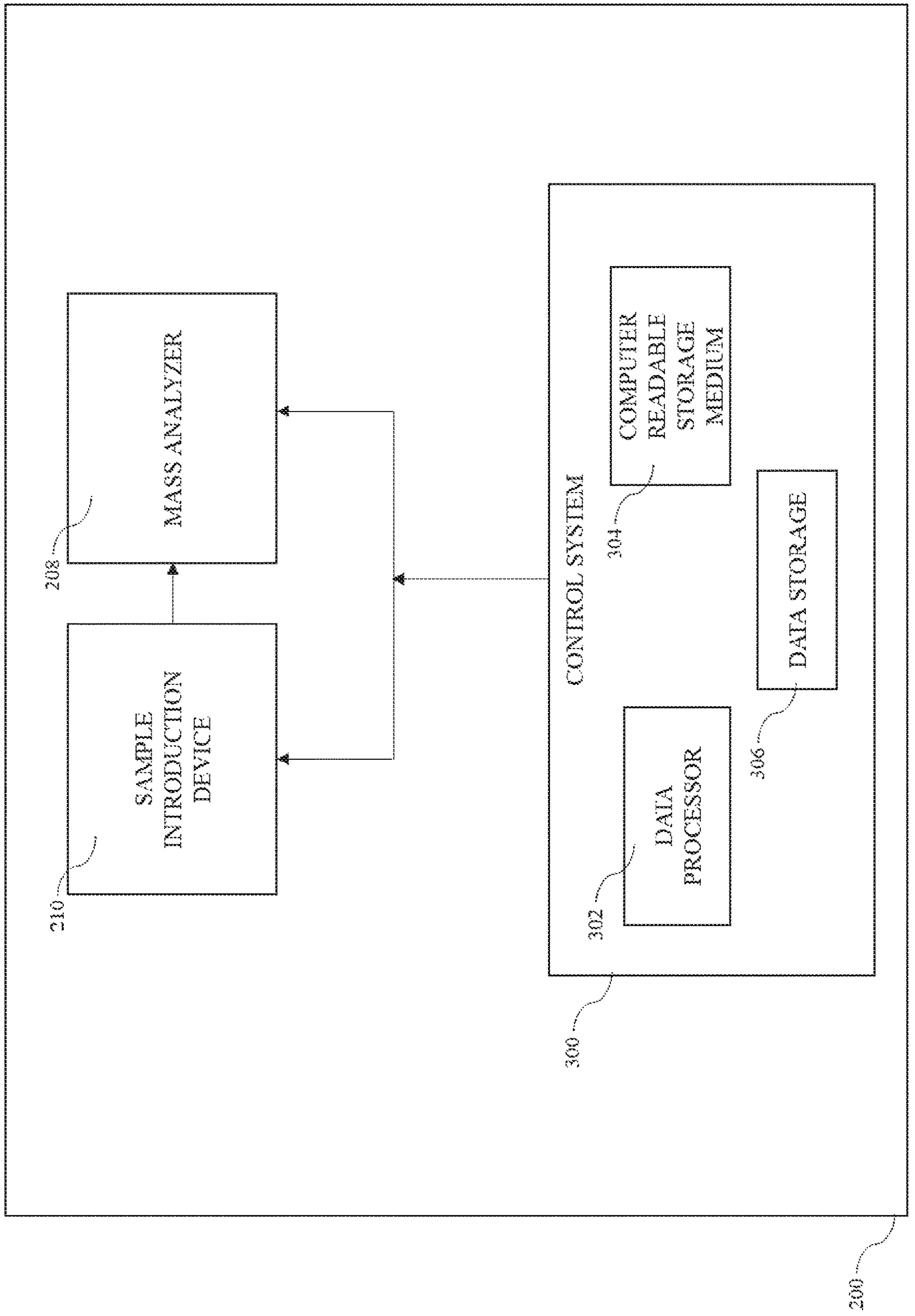
FIG. 1 shows a block diagram of a sample processing system according to an aspect of the disclosure.

It is to be understood that this disclosure is not limited to the particular methodology, protocols, and reagents described herein and as such may vary. It is also to be understood that the terminology used herein is for the purpose of describing particular aspects only and is not intended to limit the scope of the present disclosure or the appended claims.

As used herein and in the appended claims, the singular forms “a,” “an,” and “the” include plural reference unless the context clearly indicates otherwise.

The term “about” is used in connection with a numerical value throughout the specification and the claims denote an interval of accuracy, familiar and acceptable to a person skilled in the art. In general, such an interval of accuracy is +/−10%.

Unless defined otherwise, all technical and scientific terms used herein have the same meaning as commonly understood to one of ordinary skill in the art to which this disclosure belongs.

Aspects of this disclosure include a sample processing system. Aspects of sample processing systems of this disclosure are illustrated in FIGS. 1-4. The sample processing system 200 comprises a sample introduction device 210. The sample may be a biological sample. Biological samples may be biological fluids, which may include, but are not limited to, blood, plasma, serum, oral fluid, or other bodily fluids or excretions, such as but not limited to saliva, urine, cerebrospinal fluid, lacrimal fluid, perspiration, gastrointestinal fluid, amniotic fluid, mucosal fluid, pleural fluid, sebaceous oil, exhaled breath, and the like. The biological sample may also be tissue (including tissue biopsies), bone marrow, tumor samples, and other biological samples and materials derived therefrom. The sample may also be a chemical sample. Chemical samples may include any type of sample including chemicals, including, but not limited to, water samples. The sample may also be an environmental sample. Non-limiting examples of environmental samples may include air, soil, and wastes (liquids, solids or sludges). The sample may also be a food sample and the food sample may be solid, semisolid, viscous, or liquid. The food sample may also be used to test for food safety, including microbial or bacterial analysis. The sample may also be dissolved in solvent. The solvent may be a liquid, a solid, a gas, or a supercritical fluid. The solvent may be a polar or non-polar solvent. The solvent may be organic solvent. The solvent may be water, including deionized water. The sample may be mixed with a matrix material. A non-limiting example of a matrix material includes crystalline compounds. The sample may also be dissolved into a solution, incorporated into a liquid, or a component in a homogenous system.

The sample may be prepared based on the type of analysis desired. In some aspects, this may include, for example, chromatography, microflow, solid phase extraction, liquid-liquid extraction, protein precipitation, a trap-and-elute workflow, phospholipid removal, filtration, organic solvent extraction, dilution, desalting, hydrolysis, magnetic based purification, or isoelectric point precipitation.

Figure 2:
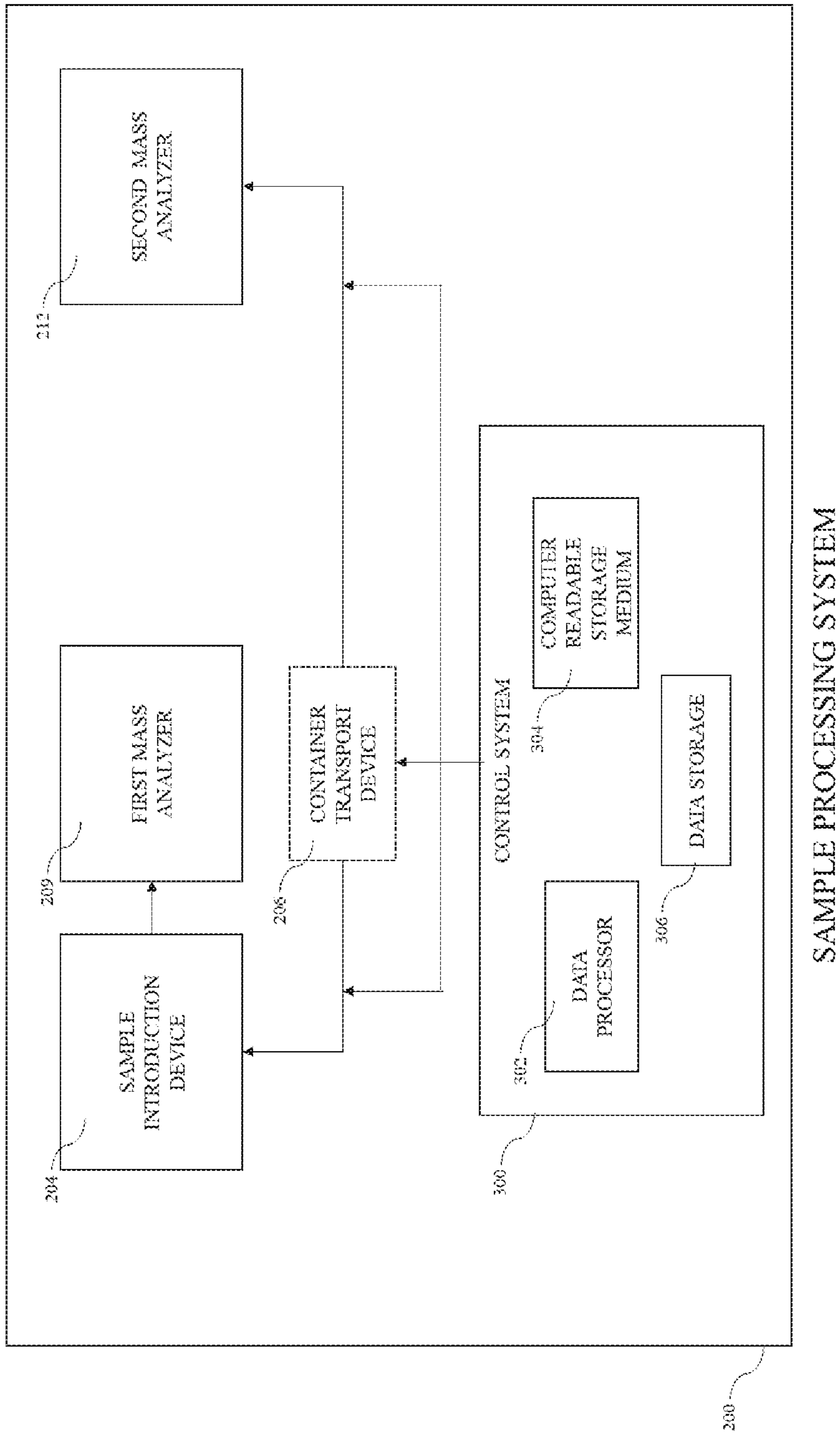
FIG. 2 shows a block diagram of a sample processing system according to an aspect of the disclosure.
Figure 3:
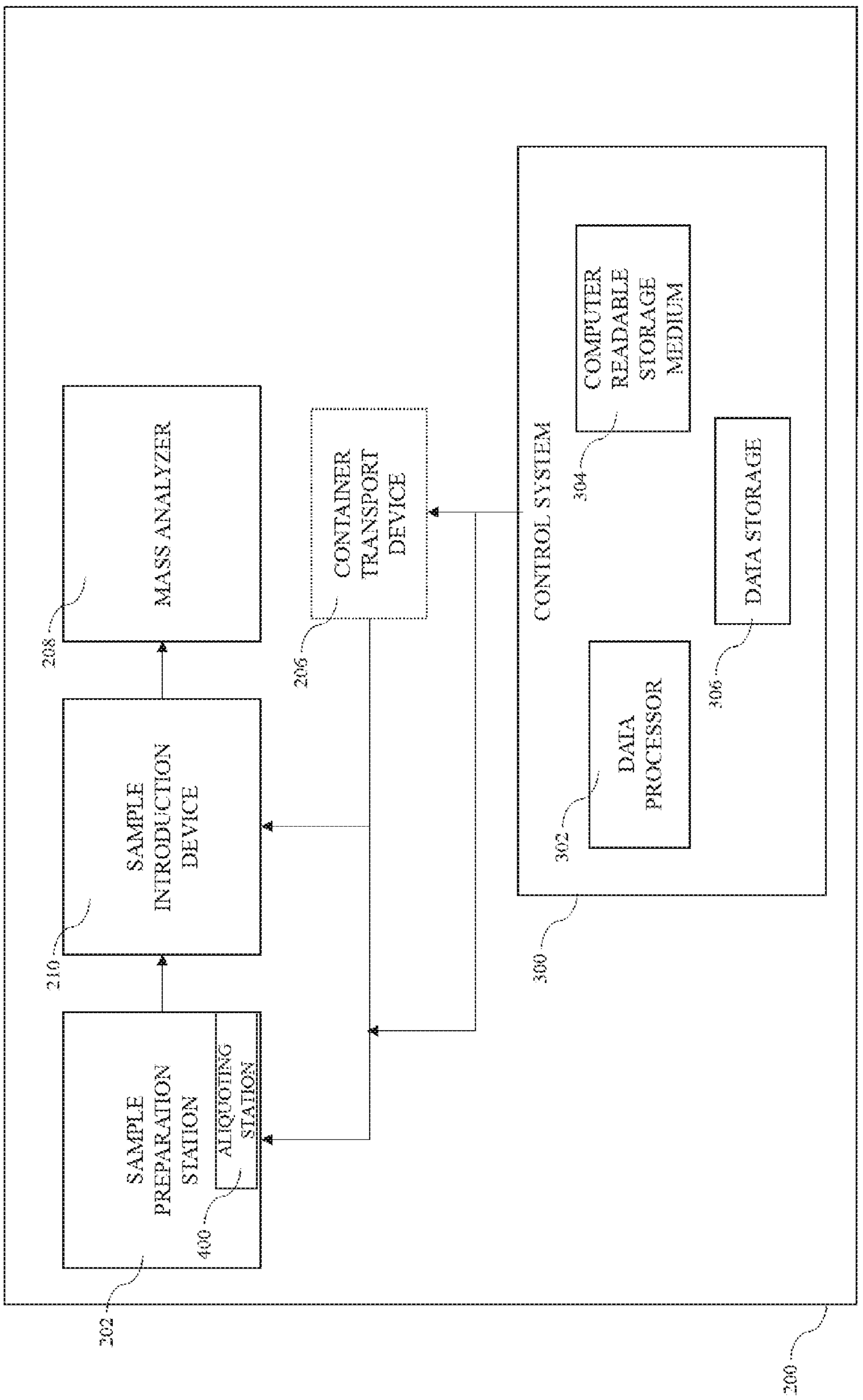
FIG. 3 shows a block diagram of a sample processing system according to an aspect of the disclosure.
Figure 4:
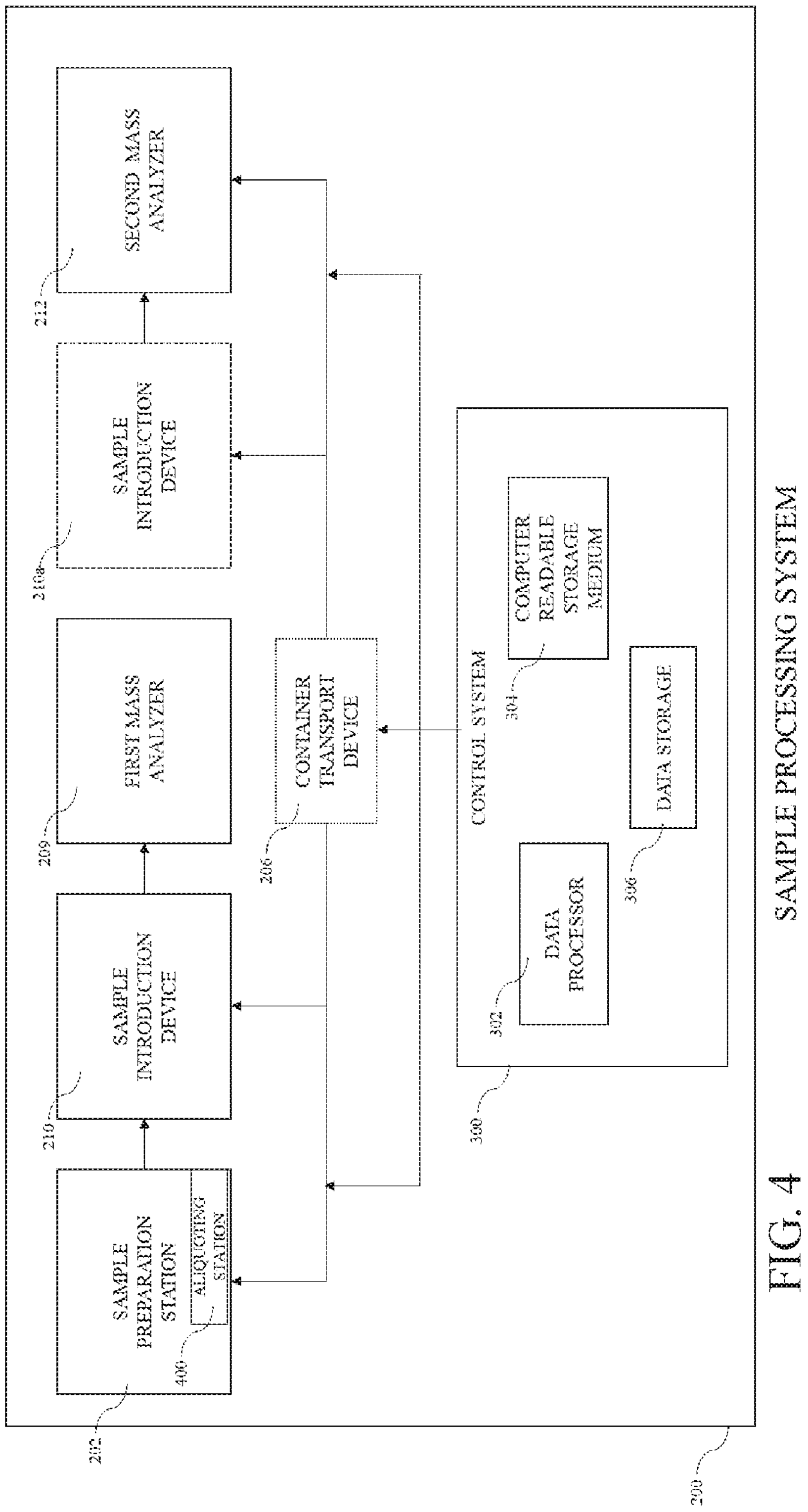
FIG. 4 shows a block diagram of a sample processing system according to an aspect of the disclosure.

In some aspects, the sample introduction device 210 can be separate from or integrated with a sample preparation system 202. As illustrated in FIGS. 3 and 4, the sample introduction device 210 is configured to receive at least one container from the sample preparation station 202 via at least one container transport device 206. Further as shown in FIGS. 2-4, the container transport device 206 may be optional and the sample may be transferred between the components of the sample processing system by a user.

The container transport device 206 can be any apparatus used to handle or transport a container. Non-limiting examples of suitable container transport devices include, but are not limited to, pick-and-place devices, such as pick-and-place transfer gantrys, transfer shuttles, such as extended linear reaction shuttles, or combinations of pick-and-place transfer gantrys and extended linear reaction shuttles. In some aspects, the sample introduction device 210 may include an aliquoting station (not shown).

In an aspect, the sample introduction device 210 is coupled to an analytical instrument, such as mass analyzer 208. In some aspects, including those illustrated in FIGS. 1 and 3, the mass analyzer 208 may be configured to perform both a first mass analysis and second mass analysis, wherein the first mass analysis is a mass screening of at least one analyte in the sample and the second mass analysis is a quantitative analysis. In other aspects, including those illustrates in FIGS. 2 and 4, the sample processing system 200 comprises a first mass analyzer 209 for conducting the first mass analysis and a second mass analyzer 212 for conducting the second mass analysis. As illustrated in FIG. 2, the first mass analyzer 209 is coupled to a sample introduction device 210. As illustrated in FIG. 4, the first mass analyzer 209 is coupled to a first sample introduction device 210 and the second mass analyzer 212 is coupled to a second sample introduction device 210*a*.

In some aspects, the sample preparation station 202 may include an aliquoting station 400. In some aspects, the aliquoting station 400 is configured to aliquot a portion of the sample to and/or from the at least one container. The aliquoting station 400 may comprise at least one aliquotter or pipettor. In some aspects, the sample preparation station 202 or the aliquoting station 400 is further configured to hold at least one reagent pack needed for the first and/or second analysis.

The sample preparation system 202 is further configured to dispense the prepared sample into at least one container. The container may be any suitable container for holding samples, including, but not limited to test tubes, centrifuge tubes, vials, cups, or bottles. In some aspects, the container is a sample plate, the sample plate comprising a plurality of sample wells. The sample wells may contain the sample. Depending on the analysis desired, the sample wells may contain several different samples and/or calibrants.

An analyte may include a substance whose presence, absence, or concentration is to be determined according to the present disclosure. Typical analytes may include, but are not limited to, organic molecules, hormones (such as thyroid hormones, estradiol, testosterone, progesterone, estrogen), metabolites (such as glucose or ethanol), proteins, lipids, carbohydrates, and sugars, steroids (such as Vitamin D), peptides (such as procalcitonin), nucleic acid segments, biomarkers (pharmaceuticals such as antibiotics, benzodiazepine), drugs (such as immunosuppressant drugs, narcotics, opioids, etc.), molecules with a regulatory effect in enzymatic processes such as promoters, activators, inhibitors, or cofactors, microorganisms (such as viruses (including EBV, HPV, HIV, HCV, HBV, Influenza, Norovirus, Rotavirus, Adenovirus, etc.), bacteria (*H. pylori, Streptococcus*, MRSA, C. diff, Ligionella, etc.), fungus, parasites (*plasmodium*, etc.), cells, cell components (such as cell membranes), spores, nucleic acids (such as DNA and RNA), etc. Aspects of the disclosure can also allow for the simultaneous analysis of multiple analytes in the same class or different classes (e.g., simultaneous analysis of metabolites and proteins).

Mass screening allows for the confirmation of a target or suspect analyte and identifying unknown analytes. Single mass analyzers (also known as single-stage), such as the magnetic sector, quadrupole, time-of-flight (TOF), and ion traps, are commonly used for mass screening. Quantitative mass analysis allows for the selection and fragmentation of molecular ions using, for example, tandem mass spectrometers, i.e., mass spectrometers that have two mass separators with an ion fragmentor disposed in the ion flight path between the two mass separators. Examples of suitable mass separators include, but are not limited to, quadrupoles, RF multipoles, ion traps, time-of-flight (TOF), and TOF in conjunction with a timed ion selector. Suitable ion fragmentors include, but are not limited to, those operating on the principles of collision induced dissociation (CID, also referred to as collisionally assisted dissociation (CAD)), photoinduced dissociation (PID), surface induced dissociation (SID), post source decay, by interaction with an electron beam (e.g., electron induced dissociation (EID), electron capture dissociation (ECD)), interaction with thermal radiation (e.g., thermal/black body infrared radiative dissociation (BIRD)), post source decay, or combinations thereof. When operated in single stage, tandem mass spectrometers can be used for qualitative mass analysis. Examples of suitable tandem mass spectrometry systems for mass analysis include, but are not limited to, those which comprise one or more of a triple quadrupole, a quadrupole-linear ion trap (e.g., QTRAP® System), a quadrupole TOF (e.g., TripleTOF® System), and a TOF-TOF. However, any suitable mass analyzer known in the art may be coupled to the sample introduction device 210.

In an aspect, the sample may be transferred from the sample introduction device 210 to the mass analyzer 208 using transfer techniques generally known in the art such as, for example, techniques comprising a microinjector, a nanoinjector, an inkjet printer nozzle, an acoustic droplet ejector (ADE), a solid phase extraction system, or a liquid aspiration system. While the transferred volumes may vary, typical volumes of transferred solutions fall within a range of about 2.5 nL to about 500 nL.

Figure 7:
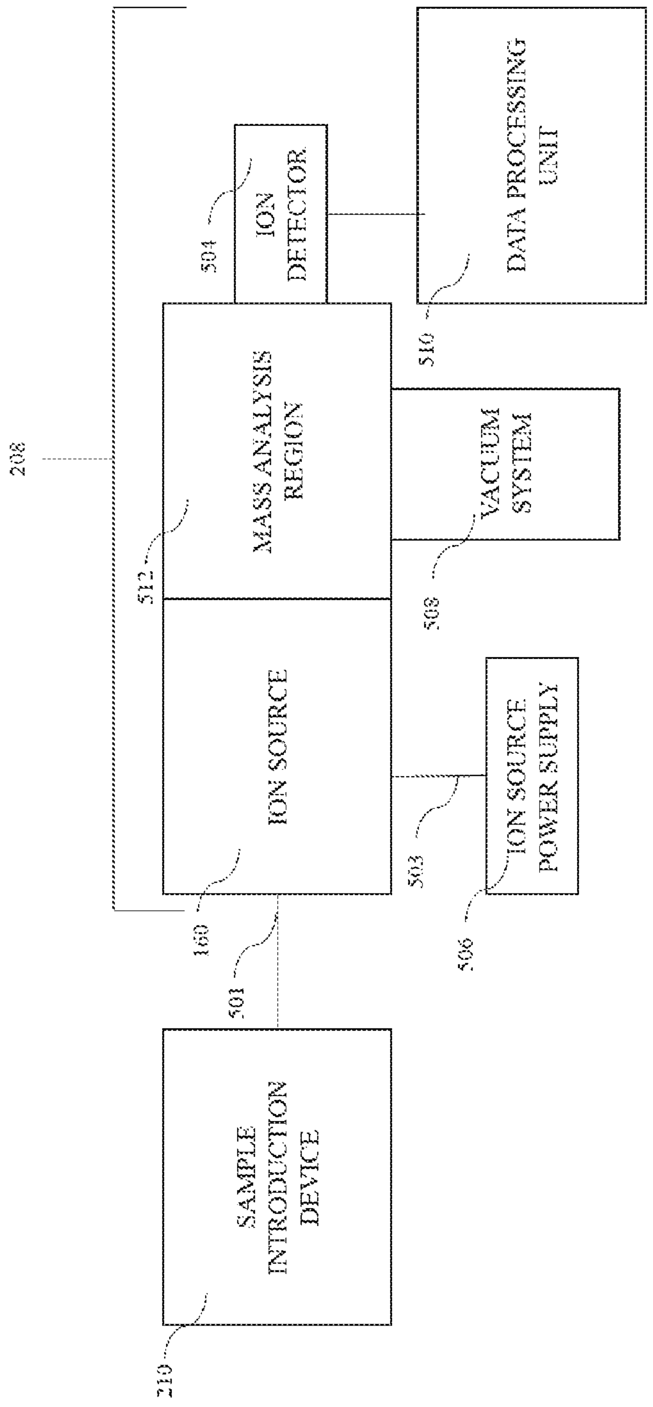
FIG. 7 shows a block diagram of a mass analyzer according to an aspect of the disclosure.

FIG. 7 shows a block diagram of a mass analyzer 208 and sample introduction device 210 coupled to the mass analyzer 208. A sample may be transferred from the sample preparation station (not shown) or transfer by a user into the sample introduction device 210. Non-limiting examples of the sample introduction device 210 include a chromatography instrument (such as a high performance liquid chromatography (HPLC) instrument or an ultra high performance liquid chromatography instrument (UPLC)), microflow system, solid-phase extraction system, liquid-liquid extraction, protein precipitation, differential mobility spectrometer, a trap-and-elute workflow, an open port interface, or direct flow injection.

The sample introduction device 210 may be coupled to the mass analyzer 208 through a connector 501. The sample introduction device 210 may introduce the sample solution to the ion source 160 through the connector 501. The ion source 160 can be controlled by an ion source power supply 506 through a signal line 503. Ions from the analytes of interest, which are generated by the ion source 160, are introduced to a mass analysis region 512, detected by an ion detector 504, and mass analyzed using a data processing unit 510. The data processing unit 510 may be a separate unit or may be part of the control system. In an aspect, the sample solution may be introduced to the ion source by acoustically ejecting the sample into a mobile phase at an open port interface (OPI) using the acoustic droplet ejector (ADE).

Figure 5:
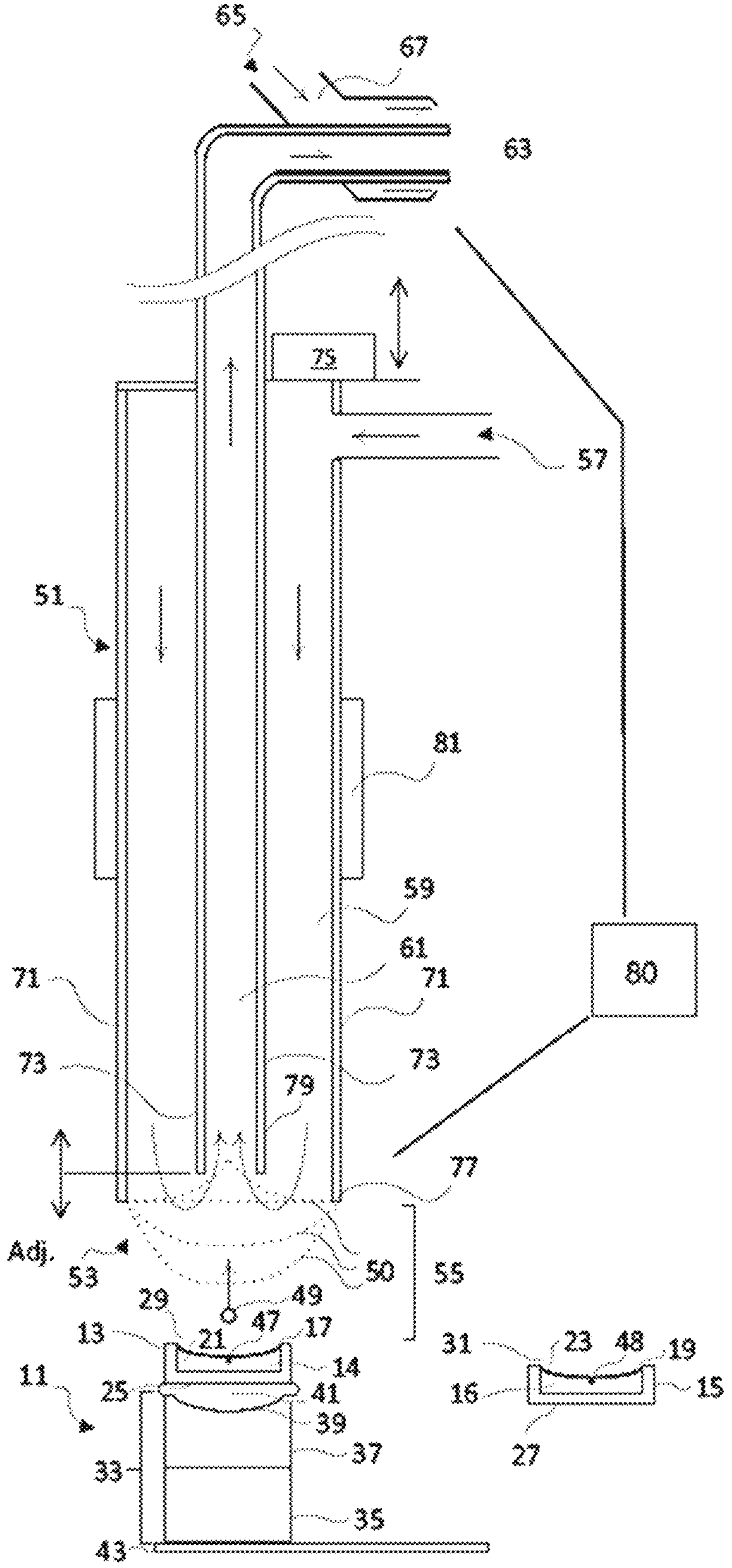
FIGS. 5 and 6 illustrate an open port interface (OPI) sampling interface and an acoustic droplet ejection (ADE) device in accordance with some example aspects and aspects of the disclosure.

In FIG. 5, an acoustic droplet ejection (ADE) device is shown generally at 11, ejecting droplet 49 toward the continuous flow sampling probe (referred to herein as an open port interface (OPI)) generally indicated at 51 and into the sampling tip 53 thereof.

The acoustic droplet ejection device 11 includes at least one container. In some aspects, the container is a sample plate with a plurality of sample wells. In FIG. 5, a first sample well is shown at 13 and an optional second sample well at 31. In some aspects, a further plurality of sample well may be provided. Each sample well is configured to house a sample having a liquid surface, e.g., a first liquid sample 14 and a second liquid sample 16 having liquid surfaces respectively indicated at 17 and 19. When more than one sample well is used, as illustrated in FIG. 5, the sample wells are preferably both substantially identical and substantially acoustically indistinguishable, although identical construction is not required.

The ADE 11 comprises an acoustic ejector 33, which includes acoustic radiation generator 35 and focusing means 37 for focusing the acoustic radiation generated at a focal point 47 within the liquid sample, near the liquid surface. As shown in FIG. 5, the focusing means 37 may comprise a single solid piece having a concave surface 39 for focusing the acoustic radiation, but the focusing means may be constructed in other ways, as discussed below. The acoustic ejector 33 is thus adapted to generate and focus acoustic radiation so as to eject a droplet of liquid from each of the liquid surfaces 17 and 19 when acoustically coupled to sample wells 13 and 15, and thus to liquids 14 and 16, respectively. The acoustic radiation generator 35 and the focusing means 37 may function as a single unit controlled by a single controller, or they may be independently controlled, depending on the desired performance of the device.

The acoustic droplet ejector 33 may be in either direct contact or indirect contact with the external surface of each sample well. With direct contact, in order to acoustically couple the ejector to a sample well, it is preferred that the direct contact be wholly conformal to ensure efficient acoustic energy transfer. That is, the ejector and the sample well should have corresponding surfaces adapted for mating contact. Thus, if acoustic coupling is achieved between the ejector and sample well through the focusing means, it is desirable for the sample well to have an outside surface that corresponds to the surface profile of the focusing means. Without conformal contact, efficiency and accuracy of acoustic energy transfer may be compromised. In addition, since many focusing means have a curved surface, the direct contact approach may necessitate the use of sample wells that have a specially formed inverse surface.

Optimally, acoustic coupling is achieved between the ejector and each of the sample wells through indirect contact, as illustrated in FIG. 5. In the figure, an acoustic coupling medium 41 is placed between the ejector 33 and the base 25 of the sample well 13, with the ejector and sample well located at a predetermined distance from each other. The acoustic coupling medium may be an acoustic coupling liquid, preferably an acoustically homogeneous material in conformal contact with both the acoustic focusing means 37 and the underside of the sample well. In addition, it is important to ensure that the liquid medium is substantially free of material having different acoustic properties than the liquid medium itself. As shown, the first sample well 13 is acoustically coupled to the acoustic focusing means 37 such that the focusing directs an acoustic wave generated by the acoustic radiation generator means 37 into the acoustic coupling medium 41, which then transmits the acoustic radiation into the sample well 13.

In operation, sample well 13 and optional sample well 15 of the device are filled with first and second liquid samples 14 and 16, respectively, as shown in FIG. 5. The acoustic ejector 33 is positioned just below sample well 13, with acoustic coupling between the ejector and the sample well provided by means of acoustic coupling medium 41. Initially, the acoustic ejector is positioned directly below sampling tip 53 of OPI 51, such that the sampling tip faces the surface 17 of the liquid sample 14 in the sample well 13. Once the ejector 33 and sample well 13 are in proper alignment below sampling tip 53, the acoustic radiation generator 35 is activated to produce acoustic radiation that is directed by the focusing means 37 to a focal point 47 near the liquid surface 17 of the first sample well. As a result, droplet 49 is ejected from the liquid surface 17 toward and into the liquid boundary 50 at the sampling tip 53 of the OPI 51, where it combines with solvent in the flow probe 53. The profile of the liquid boundary 50 at the sampling tip 53 may vary from extending beyond the sampling tip 53 to projecting inward into the OPI 51. In a multiple-sample well system, the sample well unit (not shown), e.g., a multi-well plate or tube rack, can then be repositioned relative to the acoustic ejector such that another sample well is brought into alignment with the ejector and a droplet of the next liquid sample can be ejected. The solvent in the flow probe cycles through the probe continuously, minimizing or even eliminating "carryover" between droplet ejection events. Liquid samples 14 and 16 are samples of any liquid for which transfer to an analytical instrument is desired.

The structure of OPI 51 is also shown in FIG. 5. Any number of commercially available continuous flow sampling probes can be used as is or in modified form, all of which, as is well known in the art, operates according to substantially the same principles. As can be seen in FIG. 5, the sampling tip 53 of OPI 51 is spaced apart from the liquid surface 17 in the sample well 13, with a gap 55 therebetween. The gap 55 may be an air gap, or a gap of an inert gas, or it may comprise some other gaseous material; there is no liquid bridge connecting the sampling tip 53 to the liquid 14 in the sample well 13. The OPI 51 includes a solvent inlet 57 for receiving solvent from a solvent source and a solvent transport capillary 59 for transporting the solvent flow from the solvent inlet 57 to the sampling tip 53, where the ejected droplet 49 of analyte-containing liquid sample 14 combines with the solvent to form an analyte-solvent dilution. A solvent pump (not shown) is operably connected to and in liquid communication with solvent inlet 57 to control the solvent flow rate into the solvent transport capillary and thus the rate of solvent flow within the solvent transport capillary 59 as well.

Liquid flow within the OPI 51 carries the analyte-solvent dilution through a sample transport capillary 61 provided by inner capillary tube 73 toward sample outlet 63 for subsequent transfer to an analytical instrument. For example, a qualitative mass analyzer. The acoustic droplet ejector may also eject or transfer droplets to an analytical instrument via direct flow injection or using a trap and elute system (e.g., a trap and elute system which includes two pumps and a 6-port switching valve).

A sampling pump (not shown) can be provided that is operably connected to and in liquid communication with the sample transport capillary 61, to control the output rate from outlet 63. In an exemplary aspect, a positive displacement pump is used as the solvent pump, e.g., a peristaltic pump, and, instead of a sampling pump, an aspirating nebulization system is used so that the analyte-solvent dilution is drawn out of the sample outlet 63 by the Venturi effect caused by the flow of the nebulizing gas introduced from a nebulizing gas source 65 via gas inlet 67 (shown in simplified form in FIG. 5, insofar as the features of aspirating nebulizers are well known in the art) as it flows over the outside of the sample outlet 63. The analyte-solvent dilution flow is then drawn upward through the sample transport capillary 61 by the pressure drop generated as the nebulizing gas passes over the sample outlet 63 and combines with the liquid exiting the sample transport capillary 61. A gas pressure regulator is used to control the rate of gas flow into the system via gas inlet 67. In an exemplary manner, the nebulizing gas flows over the outside of the sample transport capillary 61 at or near the sample outlet 63 in a sheath flow type manner which draws the analyte-solvent dilution through the sample transport capillary 61 as it flows across the sample outlet 63 that causes aspiration at the sample outlet upon mixing with the nebulizer gas.

The solvent transport capillary 59 and sample transport capillary 61 are provided by outer capillary tube 71 and inner capillary tube 73 substantially co-axially disposed therein, where the inner capillary tube 73 defines the sample transport capillary, and the annular space between the inner capillary tube 73 and outer capillary tube 71 defines the solvent transport capillary 59.

The system can also include an adjuster 75 coupled to the outer capillary tube 71 and the inner capillary tube 73. The adjuster 75 can be adapted for moving the outer capillary tube tip 77 and the inner capillary tube tip 79 longitudinally relative to one another. The adjuster 75 can be any device capable of moving the outer capillary tube 71 relative to the inner capillary tube 73. Exemplary adjusters 75 can be motors including, but are not limited to, electric motors (e.g., AC motors, DC motors, electrostatic motors, servo motors, etc.), hydraulic motors, pneumatic motors, translational stages, and combinations thereof. As used herein, "longitudinally" refers to an axis that runs the length of the probe 51, and the inner and outer capillary tubes 73, 71 can be arranged coaxially around a longitudinal axis of the probe 51, as shown in FIG. 5.

Additionally, as illustrated in FIG. 5, the OPI 51 may be generally affixed within an approximately cylindrical holder 81, for stability and ease of handling.

In some aspects, the sample is ionized prior to being transferred to the qualitative or quantitative mass analyzer. Suitable non-limiting ionization methods include chemical ionization (CI), electron impact ionization (EI), fast atom bombardment (FAB), electrospray ionization (ESI), atmospheric pressure chemical ionization (APCI), laser ionization (LIMS), matrix assisted laser desorption ionization (MALDI), plasma-desorption ionization (PD), resonance ionization (RIMS), secondary ionization (SIMS), and thermal ionization (TIMS).

Figure 6:
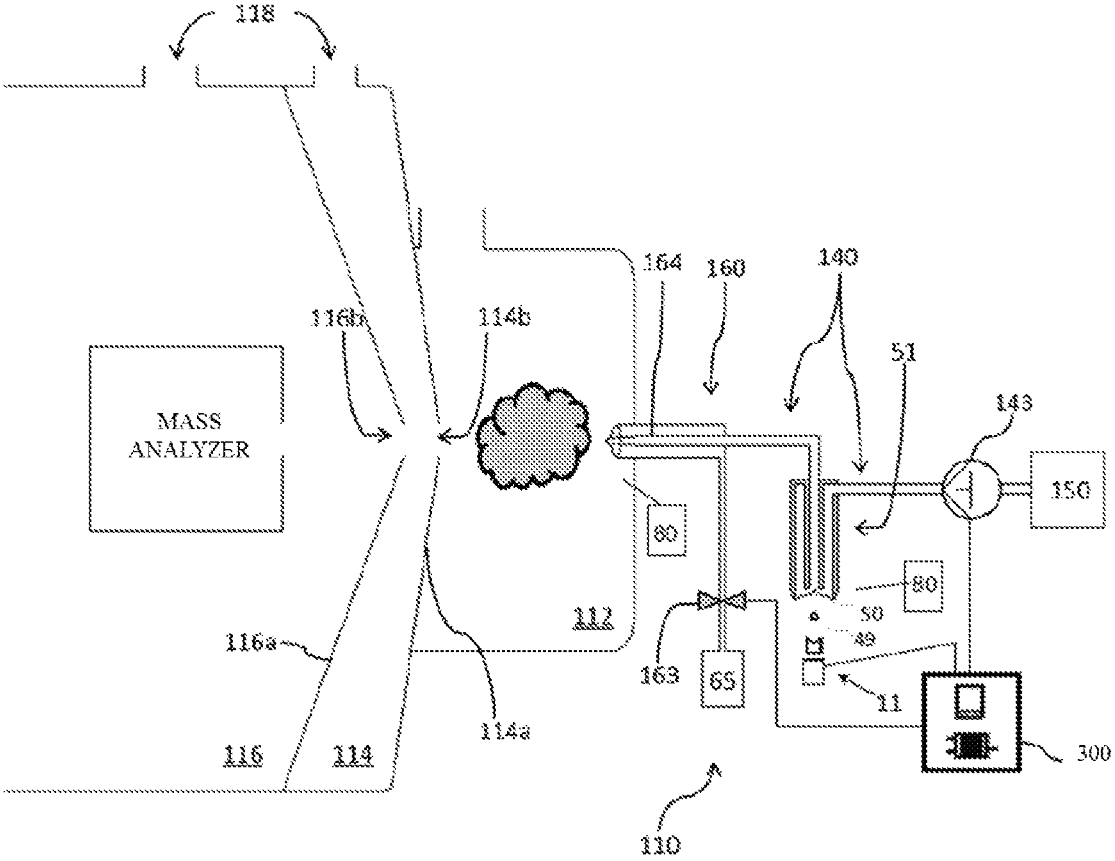

FIG. 6 schematically depicts an aspect of an exemplary system 110 in accordance with various aspects of the disclosure for ionizing and mass analyzing analytes received within an open end of a sampling probe 51, the system 110 including an acoustic droplet injection device 11 configured to inject a droplet 49, from a reservoir into the open end of the sampling probe 51. As shown in FIG. 6, the exemplary system 110 generally includes a sampling probe 51 (e.g., an open port interface) in fluid communication with a nebulizer-assisted ion source 160 for discharging a liquid containing one or more sample analytes (e.g., via electrospray electrode 164) into an ionization chamber 112, and a mass analyzer in fluid communication with the ionization chamber 112 for downstream processing and/or detection of ions generated by the ion source 160. A fluid handling system 140 (e.g., including one or more pumps 143 and one or more conduits) provides for the flow of liquid from a solvent reservoir 150 to the sampling probe 51 and from the sampling probe 51 to the ion source 160. For example, as shown in FIG. 6, the solvent reservoir 150 (e.g., containing a liquid, desorption solvent) can be fluidly coupled to the sampling probe 51 via a supply conduit through which the liquid can be delivered at a selected volumetric rate by the pump 143 (e.g., a reciprocating pump, a positive displacement pump such as a rotary, gear, plunger, piston, peristaltic, diaphragm pump, or other pump such as a gravity, impulse, pneumatic, electrokinetic, and centrifugal pump), all by way of non-limiting example. As discussed in detail below, flow of liquid into and out of the sampling probe 51 occurs within a sample space accessible at the open end such that one or more droplets can be introduced into the liquid boundary 50 at the sample tip 53 and subsequently delivered to the ion source 160. As shown, the system 110 includes an acoustic droplet injection device 11 that is configured to generate acoustic energy that is applied to a liquid contained with a sample well (as depicted in FIG. 5) that causes one or more droplets 49 to be ejected from the sample well into the open end of the sampling probe 51. A control system 300 can be operatively coupled to the acoustic droplet injection device 11 and can be configured to operate any aspect of the acoustic droplet injection device 11 (e.g., focusing means, acoustic radiation generator, automation means for positioning one or more reservoirs into alignment with the acoustic radiation generator, etc.) so as to inject droplets into the sampling probe 51 or otherwise discussed herein substantially continuously or for selected portions of an experimental protocol by way of non-limiting example.

As shown in FIG. 6, the exemplary ion source 160 can include a source 65 of pressurized gas (e.g., nitrogen, air, or a noble gas) that supplies a high-velocity nebulizing gas flow that surrounds the outlet end of the electrospray electrode 164 and interacts with the fluid discharged therefrom to enhance the formation of the sample plume and the ion release within the plume for sampling by **114*b* and 116*b*, e.g., via the interaction of the high-speed nebulizing flow and jet of liquid sample (e.g., analyte-solvent dilution). The nebulizer gas can be supplied at a variety of flow rates, for example, in a range from about 0.1 L/min to about 20 L/min, which can also be controlled under the influence of control system 300 (e.g., via opening and/or closing valve 163). In accordance with various aspects of the present teachings, it will be appreciated that the flow rate of the nebulizer gas can be adjusted (e.g., under the influence of control system 300) such that the flow rate of liquid within the sampling probe 51 can be adjusted based, for example, on suction/aspiration force generated by the interaction of the nebulizer gas and the analyte-solvent dilution as it is being discharged from the electrospray electrode 164** (e.g., due to the Venturi effect).

In the depicted aspect, the ionization chamber 112 can be maintained at an atmospheric pressure, though in some aspects, the ionization chamber 112 can be evacuated to a pressure lower than atmospheric pressure. The ionization chamber 112, within which the analyte can be ionized as the analyte-solvent dilution is discharged from the electrospray electrode 164, is separated from a gas curtain chamber 114 by a plate 114*a* having a curtain plate aperture 114*b*. As shown, a vacuum chamber 116, which houses the mass analyzer, is separated from the curtain chamber 114 by a plate 116*a* having a vacuum chamber sampling orifice 116*b*. The curtain chamber 114 and vacuum chamber 116 can be maintained at a selected pressure(s) (e.g., the same or different sub-atmospheric pressures, a pressure lower than the ionization chamber) by evacuation through one or more vacuum pump ports 118. It will also be appreciated by a person skilled in the art and in light of the teachings herein that the mass analyzer can have a variety of configurations, including a qualitative mass analyzer 208 or a quantitative mass analyzer 212.

In accordance with the aspect and aspects of the disclosure, an acoustic signal can be detected and/or monitored in one or more regions of the sampling system. In an example aspect in accordance with FIG. 5 or 6, the signal may be detected and/or monitored by a detection device or acoustic transducer 80, at or near the sampling interface region generally in the area of the liquid boundary 50, sampling tip 53, and/or gap 55, at a receiving end of a sample transport capillary (e.g., 61, 73, 77, 79) and/or at the opposite end of the fluid handling system (e.g., outlet 63 of transport capillary in FIG. 5, 140 in FIG. 6) that transfers sample to a secondary device such as an ionization chamber 112, an ion source 160, and/or an electrospray electrode 164 (e.g., as depicted in the example aspect of FIG. 5).

In some aspects, the combination of open port interface (OPI) and acoustic droplet ejection (ADE) is referred to as Acoustic Ejection Mass Spectrometry (AEMS). Examples of acoustic ejection mass spectrometry systems for qualitative mass analysis include an Echo® MS System.

It will further be appreciated that any number of additional elements can be included in the sample processing system including, for example, an ion mobility spectrometer (e.g., a differential mobility spectrometer for ion selection) that is disposed between the ionization chamber and the mass analyzer and is configured to separate ions based on their mobility through a drift gas in high- and low-fields rather than their mass-to-charge ratio. Additionally, it will be appreciated that the mass analyzer can comprise a detector that can detect the ions which pass through the mass analyzer and can, for example, supply a signal indicative of the number of ions per second that are detected.

Figure 8:
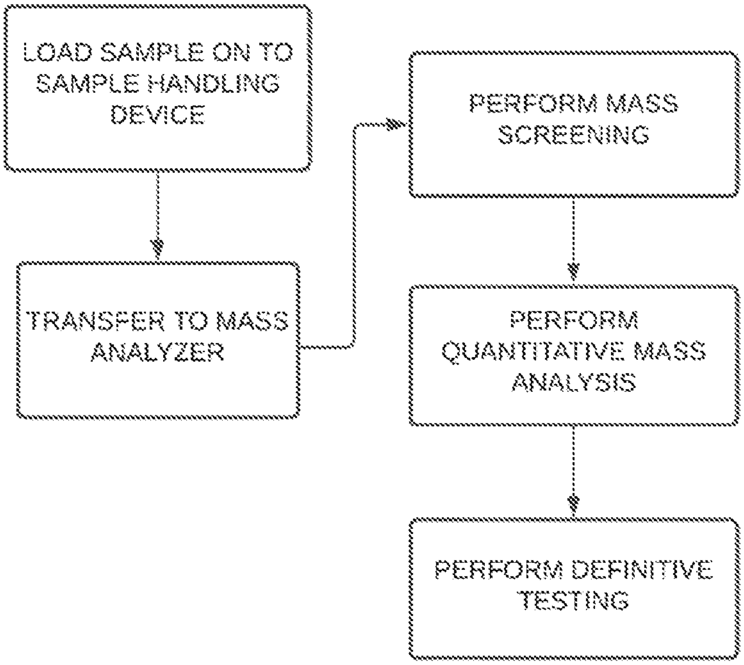
FIG. 8 shows a flowchart illustrating a sample preparation, screening, and definitive testing according to an aspect of the disclosure.
Figure 9:
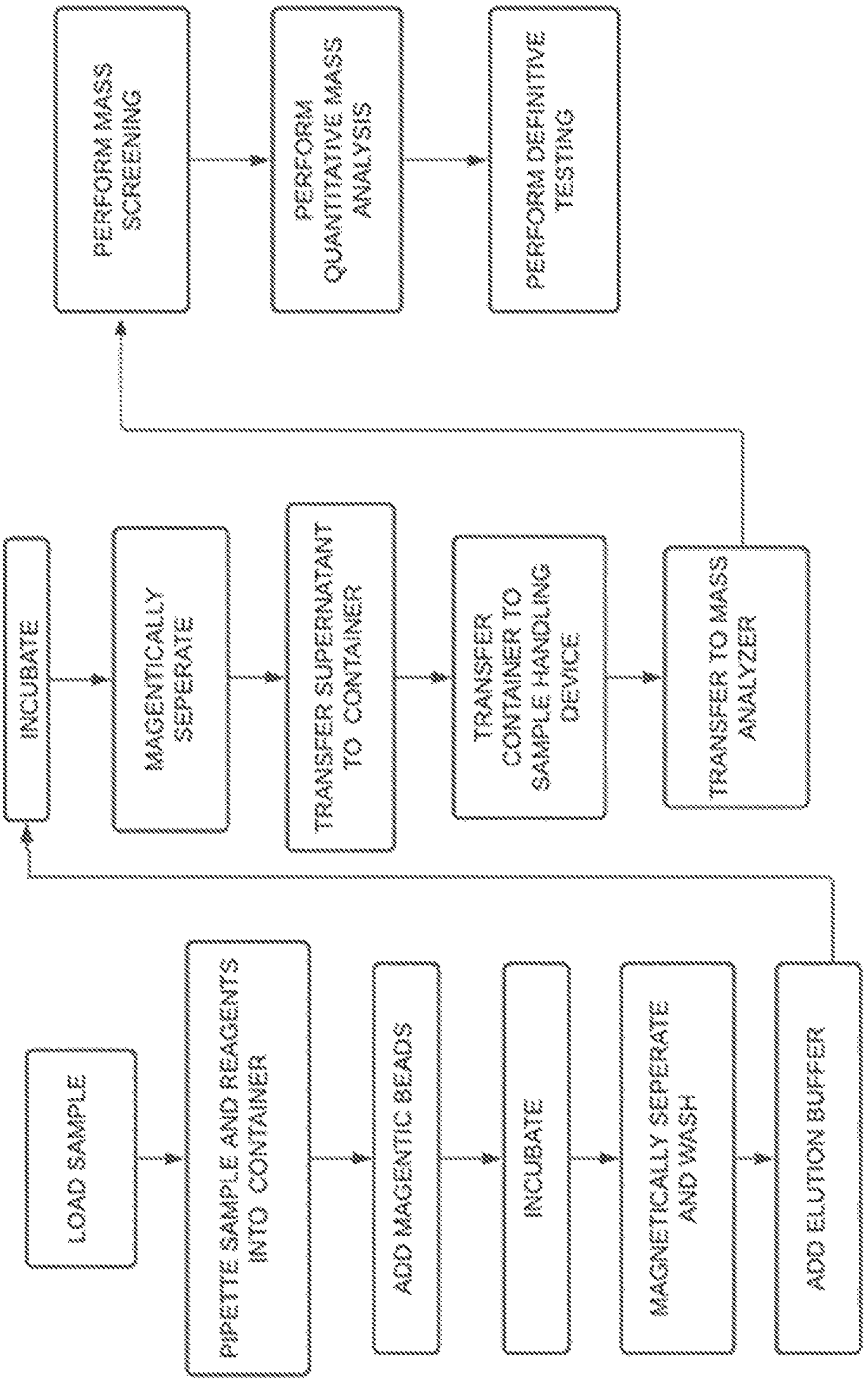
FIG. 9 shows a flowchart illustrating a sample preparation using magnetic-based purification, screening, and definitive testing according to an aspect of the disclosure.

FIG. 8 illustrates the preparation of a sample and subsequent mass screening, quantitative mass analysis, and definitive testing. FIG. 9 illustrates the preparation of a sample using magnetic-based purification and subsequent mass screening, quantitative mass analysis, and definitive testing.

Figure 10:
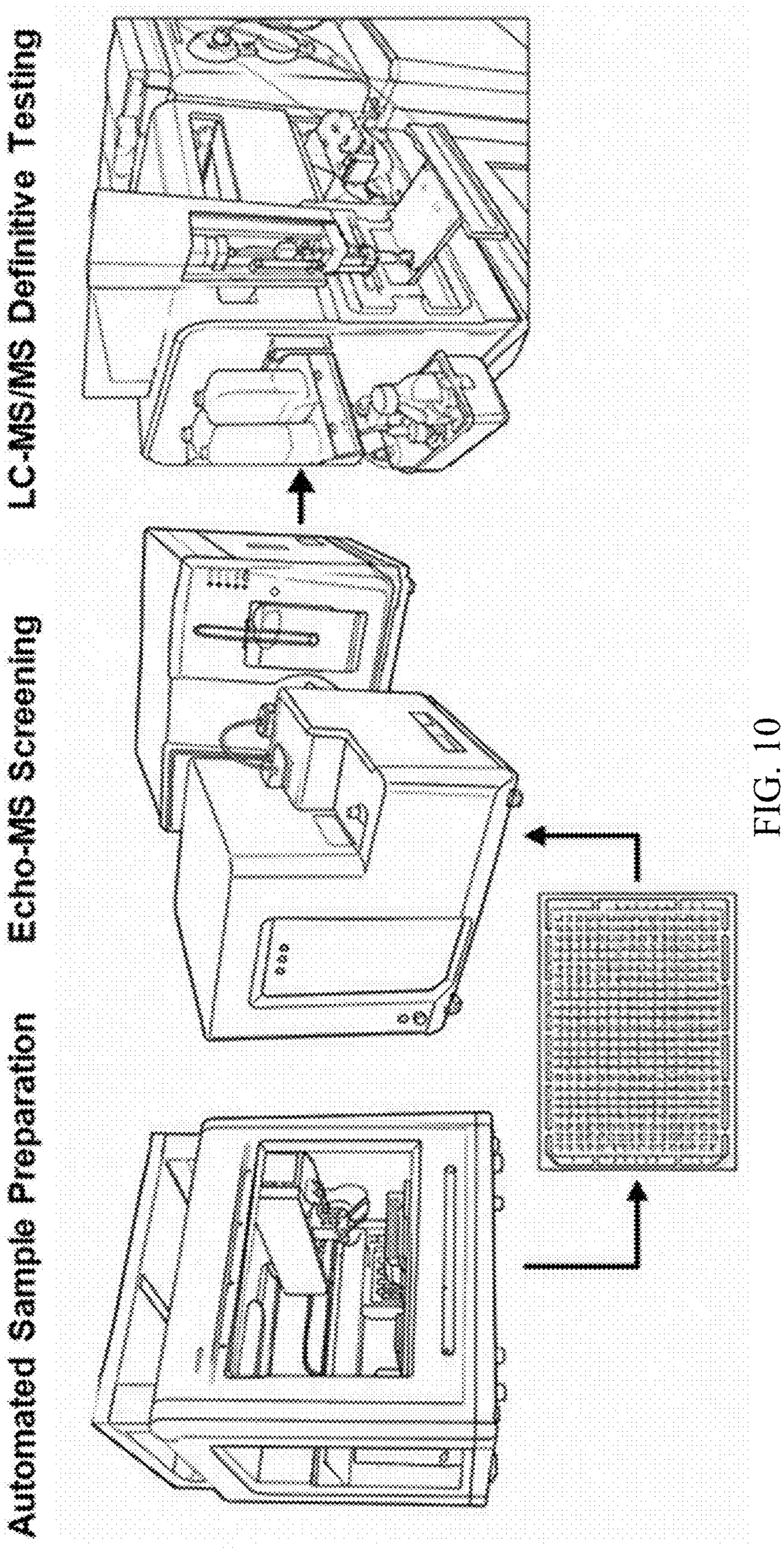
FIG. 10 shows a Microflow M5 LC-MS/MS definitive testing platform injecting a sample from an Echo® MS plate which was previously used for screening the same plate.
Figure 11:
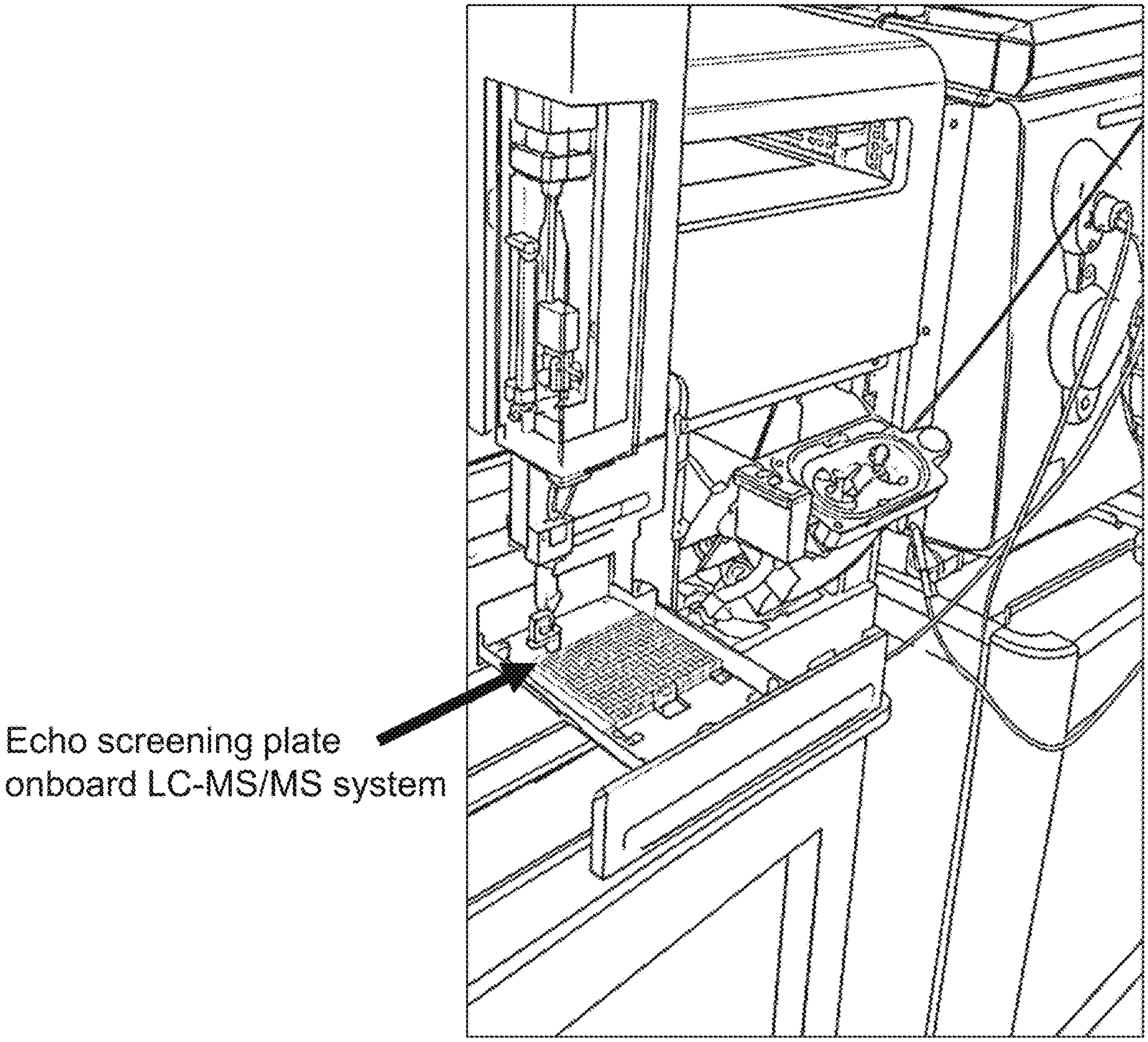
FIG. 11 shows an LC-MS/MS Injection from Echo® MS Plate using M5 Autosampler.
Figure 12:
FIG. 12 shows isotopic MRMs of fentanyl, fentanyl-d5, norfentanyl, norfentanyl-d5, dilution factors, and structures.

In some aspects the sample introduction device 210, and the mass analyzer 208 are individual components in a modular laboratory automation system. FIG. 10 shows a Microflow M5 LC-MS/MS definitive testing platform injecting a sample from an Echo® MS plate (available from Beckman Coulter Life Sciences) which was previously used for screening the same plate. FIG. 11 shows an LC-MS/MS Injection from Echo® MS Plate using M5 Autosampler. Echo and Echo MS are trademarks or registered trademarks of Labcyte, Inc. in the United States and other countries, and are being used under license. In some aspects the sample introduction device 210 and the mass analyzer 208 can be a completely integrated platform. In other aspects, the sample introduction device 210 may be part of a sample preparation station 202.

The sample processing system may include a control system 300. The control system may be configured to control the sample preparation station 202, the container transport device 206, the sample introduction device 210, and/or the mass analyzers 208, 208*a*, 212. In an aspect, there is a plurality of control systems that can control an individual element or a combination of elements. In an aspect, the control system may also include a data processor 302, a computer-readable storage medium 304 (including a computer program), and data storage 306. In an aspect, the sample data from an isotopic MRM workflow is processed using a computer program comprising a non-transitory and tangible computer-readable storage medium.

The term "computer-readable storage medium" as used herein refers to any media that participates in providing instructions to a processor for execution. Such a medium may take many forms, including but not limited to, non-volatile media, volatile media, and transmission media. Non-volatile media includes, for example, optical or magnetic disks, such as storage device. Volatile media includes dynamic memory, such as memory. Transmission media includes coaxial cables, copper wire, and fiber optics, including the wires that comprise bus.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

In an aspect, the mass analyzer 208 or first mass analyzer 208*a* is used to screen the sample for an analyte of interest. If an analyte of interest is detected in the sample, for example, above a certain qualitative threshold, such as having a signal above background noise, the mass analyzer 208 or second mass analyzer 212 is used to perform a quantitative analysis of the analyte. The quantitative analysis includes performing a separation step on the sample, ionizing the separated components of the sample; monitoring, by mass spectrometry, at least one product ion transition for the at least one analyte and at least one isotopic ion transition for the at least one analyte; determining the intensity and/or abundance of the at least one product ion transition and/or the at least one isotopic ion transition; and quantifying the at least one analyte present in the sample using the intensity and/or abundance of the product ion transition and/or isotopic ion transition. The separation step can involve one or more than one of several separation techniques including chromatography and ion mobility. For ion mobility, the step can comprise the use of differential mobility spectrometry.

The monitoring of the product ion transition and/or isotopic ion transition for the at least one analyte may also include monitoring an isotopic abundance for at least one ion pair of the at least one analyte. As long as the mass-to-charge ratio (m/z) for the analytes of interest and/or corresponding ion pairs do not overlap, an infinite number of ion pairs can be monitored. This allows for the quantification of multiple analytes in one sample. In exemplary methods, two analytes are quantified, alternatively at least three analytes are quantified, alternatively at least four analytes are quantified, alternatively at least five analytes are quantified, alternatively at least six analytes are quantified, alternatively at least seven analytes are quantified, alternatively at least eight analytes are quantified, alternatively at least nine analytes are quantified, alternatively at least ten analytes are quantified.

Product ion transition monitoring is a technique in which the m/z range of a first mass separator is specifically selected to transmit a molecular ion (often referred to as "the parent ion" or "the precursor ion") to an ion fragmentor to produce fragment ions (often referred to as "daughter ions" or "product ion"). The transmitted m/z range of a second mass separator is selected to transmit one or more product ions to a detector that measures the product ion signal. The observed m/z ratio (and may also referred to as "mass data") of a parent (or precursor) ion and its corresponding product (or daughter) ion is a product ion transition. This ion transition may also be referred to as a precursor-product ion transition or a product-daughter ion transition. In a multiple reaction monitoring ("MRM") workflow, two or more transitions are monitored, each corresponding to a different fragment or product ion. For example, the parent ion of morphine is 286, and the most intense ions created by the fragmentation of 286 are 201, 181, and 165. As such, the three product ion transitions for morphine are 286→201, 286→181, and 286→165.

In other exemplary methods, at least two product ion transitions are monitored, alternatively at least three product ion transitions are monitored, alternatively at least four product ion transitions are monitored, alternatively at least five product ion transitions are monitored, alternatively at least six product ion transitions are monitored, alternatively at least seven product ion transitions are monitored, alternatively at least eight product ion transitions are monitored, alternatively at least nine product ion transitions are monitored, alternatively at least ten product ion transitions are monitored. In some exemplary methods, the product ion has an intensity and/or abundance of about 100%. In some exemplary methods, the product ion is the most intense and/or abundant isotope of the at least one analyte.

In an isotopic multiple reaction monitoring ("Isotopic MRM"), the workflow utilizes the ion transitions based on the natural isotopic abundance of analytes. This ion transition may also be referred to as a precursor-isotopic ion transition or isotopic ion transition. For example, there are two stable isotopes of chlorine; chlorine 35 (75.8% natural abundance) and chlorine 37 (24.2% natural abundance). In general, each natural isotopic ion's relative abundance value is different from another in a proportionally decreasing fashion. For example, the intensity and/or abundance of the isotopic ion is less than about 100%, alternatively less than about 50%, alternatively less than about 25%, alternatively less than about 15%, alternatively less than about 10%, alternatively less than about 5% than a precursor and/or the product ion. The natural isotopic daughter ion acts as an internal standard, allowing for quantification of the analyte without requiring the addition of a calibrant or stable-isotope labeled analyte.

Extending the linear dynamic range for a given analyte can be done by using a natural isotopic MRM for quantification, which yields an abundance range compatible with other analytes in a given panel and using a less abundant isotopic ion transition decreases peak intensity and avoids detector overload.

In other exemplary methods, at least two isotopic ion transitions are monitored, alternatively at least three isotopic ion transitions are monitored, alternatively at least four isotopic ion transitions are monitored, alternatively at least five isotopic ion transitions are monitored, alternatively at least six isotopic ion transitions are monitored, alternatively at least seven isotopic ion transitions are monitored, alternatively at least eight isotopic ion transitions are monitored, alternatively at least nine isotopic ion transitions are monitored, alternatively at least ten isotopic ion transitions are monitored.

In a further aspect, if the product ion transition meets a condition, the method further comprises determining the intensity and/or abundance of the at least one isotopic ion transition; and quantifying the at least one analyte present in the sample using the intensity and/or abundance of the isotopic ion transition. Non-limiting examples of a condition include ionization saturation, detector saturation, product ions generated near the peak apex, peak shape, a threshold intensity and/or a threshold abundance. When the product ion transition meets this condition, the peak quality and/or detector saturation makes it difficult to quantify the analyte using the product ion transition and an isotopic ion transition is used for quantification.

For example, if the lowest endogenous biomarker level is at the instrument detection limit for a normal "healthy" sample but an affected "sick" sample is above the detector saturation, or meet another condition, instead of reprocessing and diluting the sample, a lower isotopic intensity ion transition may be used. By using less abundant isotopic MRM transitions, it is possible to analyze multiple analytes of varying concentrations without changing the dilution factor of samples, eliminating the need to reprocess and rerun the sample.

The intensity, or area, of a product ion transition or isotopic ion transition depends on several factors including concentration, ease of ionization, and fragmentation efficiency. The peak areas for product ion transitions or isotopic ion transitions are integrated as measures of product ion or isotopic ion abundance and serve as the basis for quantitative comparisons. To quantify an analyte using product ion transitions or isotopic ion transitions, the signal intensity or relative abundance of the product ion and/or isotopic ion is compared to, for example, a standard curve constructed using one or more standard compounds (i.e., calibration curve) and/or by calculating a ratio of at least one isotopic ion transition to the corresponding analyte, and quantifying the amount of the analyte in the sample using the calculated ratio. The calculated ratio may be used to calculate an isotopic dilution factor ("IDF"). This IDF may be used as a multiplier to compensate for abundance differences between the naturally occurring abundant isotopes and the corresponding analyte and/or precursor. In some aspects, the precursor is most abundant isotope. In some aspects, the isotope MRM conditions may be auto-optimized. For example, the theoretical isotope intensity ratio of both precursor and isotopic ions, and the desired intensity level is used to choose the isotope MRM conditions.

Extending the linear dynamic range for a given analyte can be done by using a natural isotopic MRM transition for quantification, which yields an abundance range compatible with other analytes in a given panel and using a less abundant isotopic MRM transition decreases peak intensity and avoids detector overload. Monitoring these less abundant isotopic transitions could extend the dynamic range by up to 100x, without the need for reanalysis.

EXAMPLES

Example 1: Use of Isotopic MRMs to Mimic a Dilution for Definitive Testing

Instead of running two assays on the same sample, only one assay run is required for quantification when an isotopic MRM workflow for fentanyl and its metabolite, norfentanyl, is employed.

The sample is collected using any specimen collection method known in the art. Urine samples can be collected according to the SAMHSA guidelines (Substance Abuse and Mental Health Services Administration Center for Substance Abuse Prevention), available at https://www.samhsa.gov/sites/default/files/specimen-collection-handbook-2014.pdf. Urine specimens are typically submitted to certified laboratories within 24 hours after collection.

Figure 13:
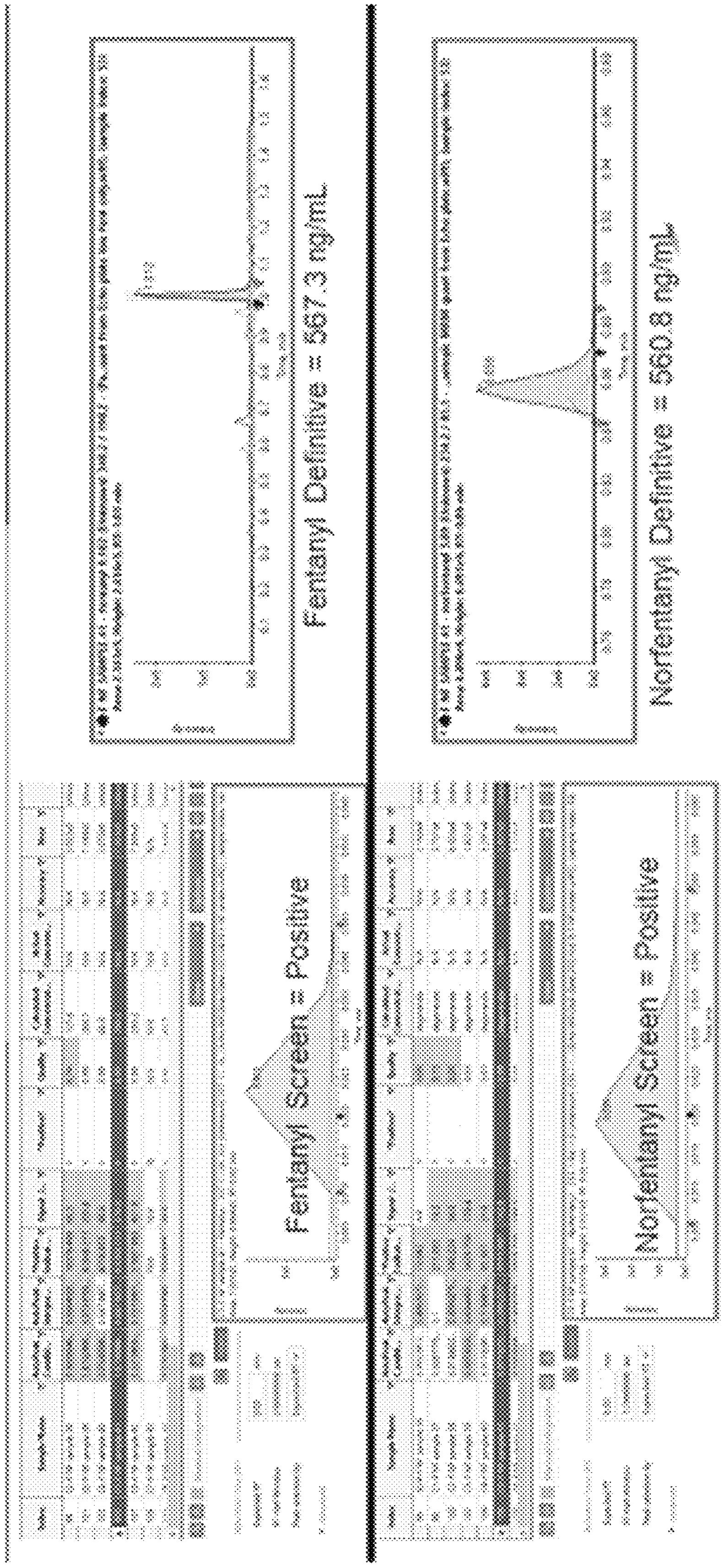
FIG. 13 shows screening and definitive analysis of urine sample 41 from a single sample preparation in an Echo MS plate.

FIG. 13 shows isotopic MRMs of fentanyl, fentanyl-d5, norfentanyl, norfentanyl-d5, their dilution factors, and their structures.

The urine samples are prepared using reagent grade water and mass spectrometry HPLC reagents. In an Echo® 384-well plate, 14 μL of fentanyl-d5 and norfentanyl-d5 internal standards (2000 ng/mL each) in water were added to 36 μL of the urine sample. The plate was then shook on a planar rotator.

Using Echo® MS, the urine samples are screened for the presence of fentanyl and norfentanyl. Once fentanyl and norfentanyl have been positively identified, the sample plate is transferred to an LC-MS/MS system and the fentanyl and norfentanyl undergo definitive testing. As shown in FIG. 13, urine sample 41 from a single sample preparation in an Echo MS plate was screened and quantified. The left hand side shows that the Echo MS screen was positive for both fentanyl and norfentanyl. The figures on top and bottom right side show the same sample's definitive test result using the isotopic MRMs; that the fentanyl concentration was 567.3 ng/ml and the norfentanyl concentration was 560.8 ng/ml.

Figure 14A:
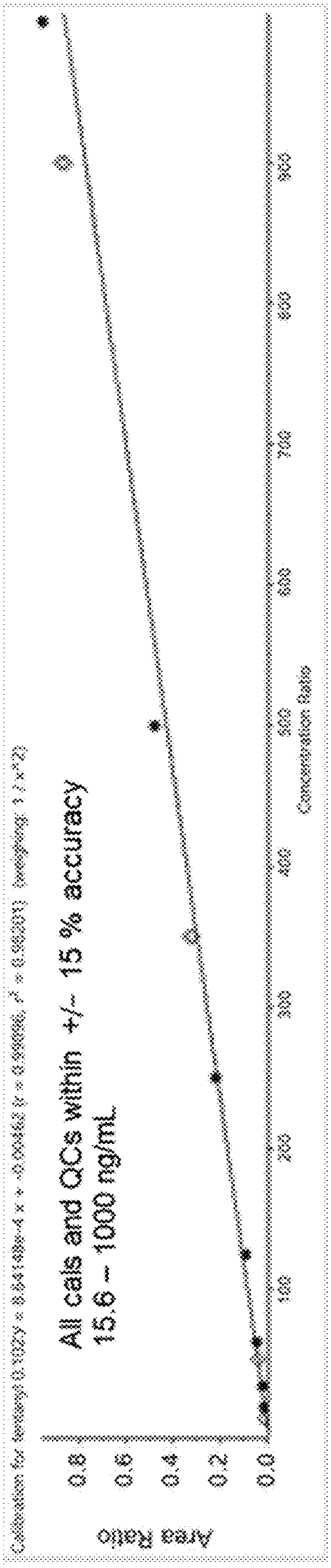
FIGS. 14A and 14B show definitive testing calibration curves of fentanyl and norfentanyl isotopic MRMs with accuracy information for calibrators and quality control samples.
Figure 14B:
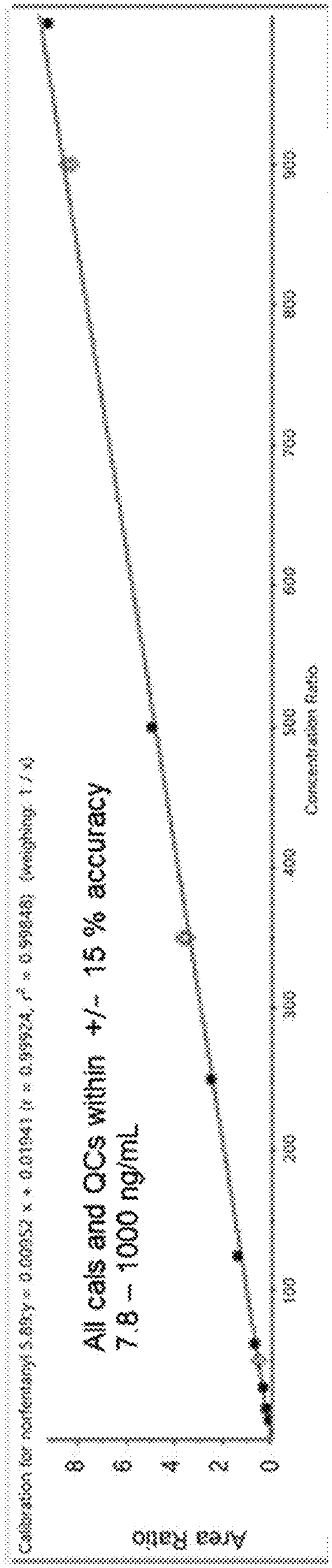

Calibration curves were also established using several different fentanyl and norfentanyl calibrators and quality control samples. As illustrated in FIGS. 14A and 14B, the calibration curves demonstrate good linearity over the calibration concentrations.

Figure 16A:
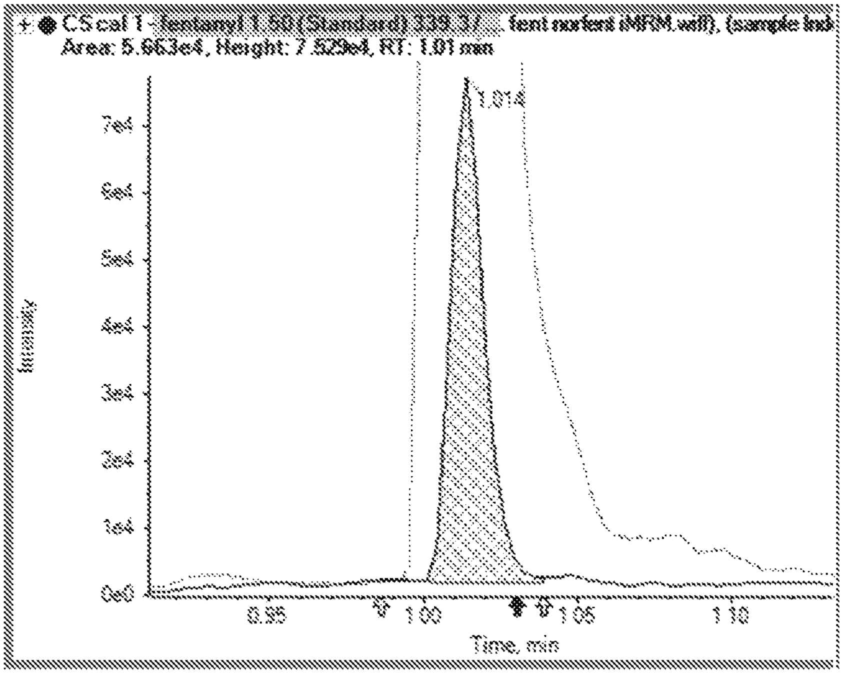
FIGS. 16A and 16B show LLOQ chromatograms for isotopic MRMs for fentanyl, fentanyl-d5, norfentanyl, and norfentanyl-d5.
Figure 16B:
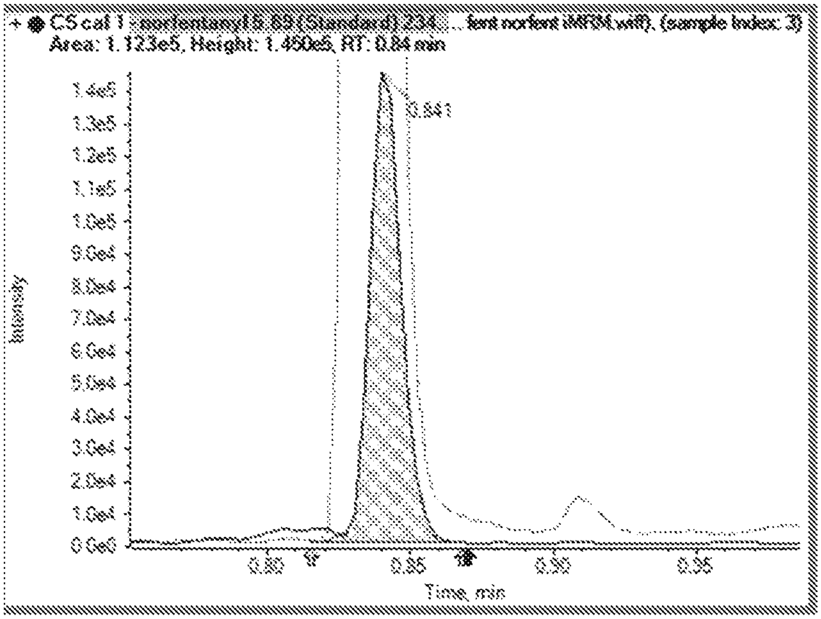
Figure 18A:
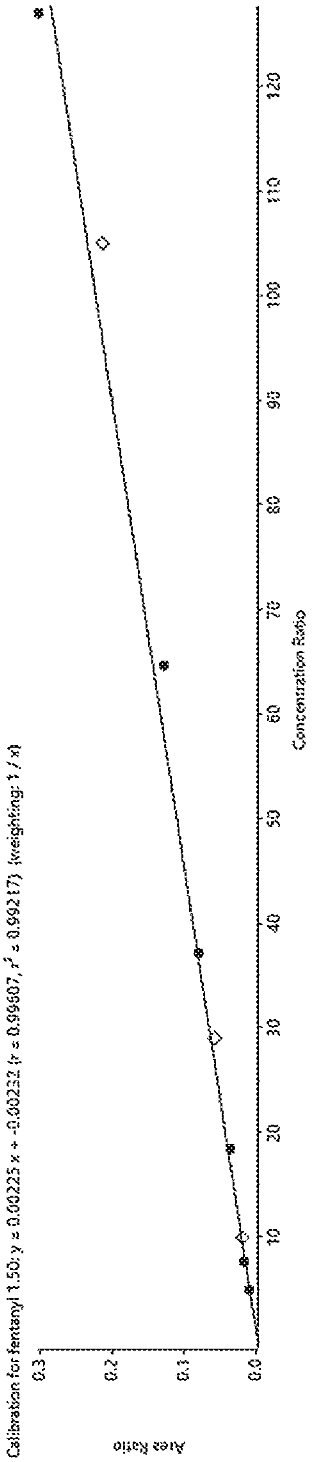
FIGS. 18A and 18B show isotopic MRM calibration curves for fentanyl (FIG. 18A) and norfentanyl (FIG. 18B).
Figure 18B:
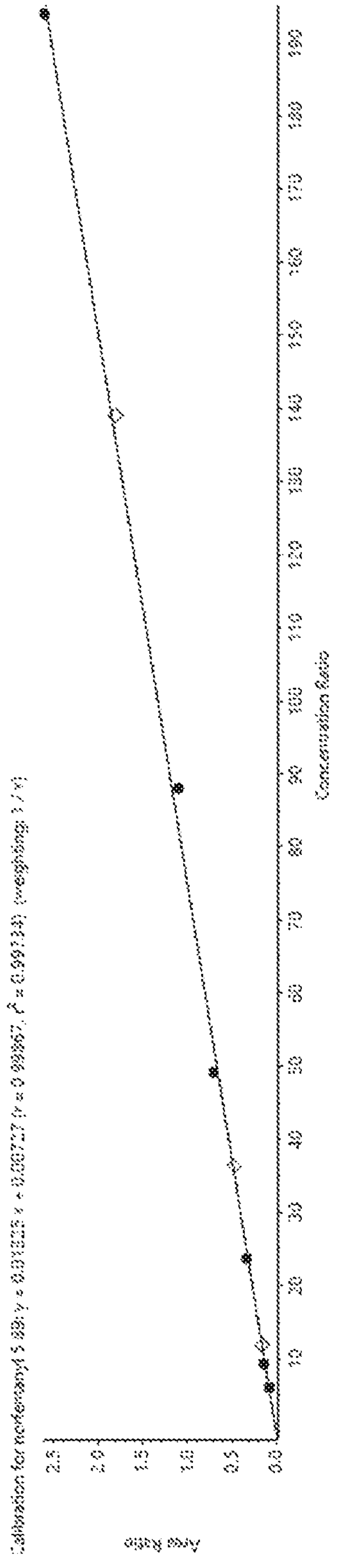

In another example, the urine sample undergoes the same processing and screening, but different isotopes are used for the fentanyl isotopic MRM (as shown in FIGS. 15A and 15B). Using the isotopic MRMs, FIGS. 16A and 16B show the lower limit of quantification (LLOQ) (which is the lowest amount of an analyte in a sample that can be quantitatively determined with suitable precision and accuracy (bias)) for fentanyl, fentanyl-d5 (FIG. 16A), norfentanyl, and norfentanyl-d5 (FIG. 16B). Calibration curves are established using fentanyl and norfentanyl calibrators at six different concentrations. In addition to the calibrators, the calibration curves are run with a blank sample and three quality controls for both fentanyl and norfentanyl. (FIGS. 17A, 17B, 18A, and 18B).

Other aspects, advantages, and modifications are described in the following subparagraphs:

1. A sample processing system comprising:
   - at least one sample introduction device, wherein the at least one sample introduction device is configured to receive a sample;
   - a mass analyzer coupled to the sample introduction device;
   - a control system configured to at least control the at least one sample introduction device and/or the mass analyzer, wherein the mass analyzer is configured to perform a first mass analysis on the sample, wherein the first mass analysis is mass screening for an analyte of interest in the sample,
   - and wherein if the analyte of interest is detected in the sample, the mass analyzer is configured to perform a second mass analysis, wherein the second mass analysis is a quantitative analysis, comprising:

- ionizing the sample;
   - monitoring, by mass spectrometry, at least one product ion transition for the at least one analyte and at least one isotopic ion transition for the at least one analyte;
   - determining intensity and/or abundance of the at least one product ion transition and/or the at least one isotopic ion transition; and
   - quantifying the at least one analyte present in the sample using the intensity and/or abundance of the at least one product ion transition and/or isotopic ion transition.
2. The sample processing system of subparagraph 1, wherein the product ion transition has an intensity and/or abundance of about 100%.
3. The sample processing system of subparagraph 1 or subparagraph 2, wherein the product ion transition is the most intense and/or abundant isotope of the at least one analyte.
4. The sample processing system of any one of subparagraphs 1 to 3, wherein the intensity and/or abundance of the isotopic ion transition is less than about 100%, alternatively less than about 50%, alternatively less than about 25%, alternatively less than about 15%, alternatively less than about 10%, alternatively less than about 5% than a precursor and/or the product ion transition.
5. The sample processing system of any one of subparagraphs 1-4, wherein determining the intensity and/or abundance of the at least one product ion transition and/or isotopic ion transition comprises obtaining mass data corresponding to the at least one product ion transition and/or isotopic ion transition.
6. The sample processing system of any one of subparagraphs 1-5, wherein at least two analytes are quantified, alternatively at least three analytes are quantified, alternatively at least four analytes are quantified, alternatively at least five analytes are quantified, alternatively at least six analytes are quantified, alternatively at least seven analytes are quantified, alternatively at least eight analytes are quantified, alternatively at least nine analytes are quantified, alternatively at least ten analytes are quantified.
7. The sample processing system of any one of subparagraphs 1-6, wherein at least two product ion transitions are monitored, alternatively at least three product ion transitions are monitored, alternatively at least four product ion transitions are monitored, alternatively at least five product ion transitions are monitored, alternatively at least six product ion transitions are monitored, alternatively at least seven product ion transitions are monitored, alternatively at least eight product ion transitions are monitored, alternatively at least nine precursor-product ion transitions are monitored, alternatively at least ten precursor-product ion transitions are monitored.
8. The sample processing system of any one of subparagraphs 1-7, wherein at least two isotopic ion transitions are monitored, alternatively at least three isotopic ion transitions are monitored, alternatively at least four isotopic ion transitions are monitored, alternatively at least five isotopic ion transitions are monitored, alternatively at least six isotopic ion transitions are monitored, alternatively at least seven isotopic ion transitions are monitored, alternatively at least eight isotopic ion transitions are monitored, alternatively at least nine isotopic ion transitions are monitored, alternatively at least ten isotopic ion transitions are monitored.

9. The sample processing system of any one of subparagraphs 6-8, wherein the further comprising quantifying at least a second analyte in the sample using a product ion transition and/or isotopic ion transition of the second analyte.
10. The sample processing system of any one of subparagraphs 1-9, wherein the control system comprises a non-transitory and tangible computer-readable storage medium is used to determine the intensity and/or abundance of the isotopic ion transition.
11. The sample processing system of any one of subparagraphs 1-10, wherein if the product ion transition meets a condition, selecting the most intense and/or abundant isotopic ion transition that does not meet the condition, and quantifying the at least one analyte present in the sample using the intensity and/or abundance of said isotopic ion transition.
12. The sample processing system of subparagraph 11, wherein the condition is ionization saturation, detector saturation, product ions generated near a peak apex, peak shape, a threshold intensity and/or a threshold abundance.
13. The sample processing system of any one of subparagraphs 1-12 wherein quantifying the at least one analyte present in the sample comprises:

performing a separation step on the sample prior to ionization, using the intensity and/or abundance of the at least one product ion transition and/or the at least one isotopic ion transition to calculate a ratio of the at least one product ion transition and/or the at least one isotopic ion transition to the corresponding analyte and/or precursor, and quantifying the analyte in the sample using the calculated ratio.

14. The sample processing system of subparagraph 13, wherein the calculated ratio is used to calculate an isotopic dilution factor (IDF).
15. The sample processing system of subparagraph 14, wherein the IDF is used as a multiplier to compensate for abundance differences between the product ion transition and/or isotopic ion transition and the corresponding analyte.
16. The sample processing system of any one of subparagraph 13-15, wherein the control system comprises a non-transitory and tangible computer-readable storage medium is used to calculate the ratio of the at least one product ion transition and/or isotopic ion transition to the corresponding analyte and/or the precursor, and/or quantifying the at least one analyte in the sample using the calculated ratio.
17. The sample processing system of any one of subparagraphs 1-16, wherein the sample introduction device comprises an acoustic droplet ejector (ADE), a solid phase extraction system, liquid-liquid extraction, protein precipitation, a liquid aspiration system, a microinjector, a nanoinjector, an inkjet printer nozzle, a chromatography instrument, microflow system, solid phase extraction system, differential mobility spectrometer, a trap-and-elute workflow, an open port interface, or direct flow injection.
18. The sample processing system of subparagraph 17, wherein the sample introduction comprises acoustically ejecting the liquid sample into a mobile phase at an open port interface (OPI) using the acoustic droplet ejector (ADE).
19. The sample processing system of subparagraph 17, wherein the chromatography instrument is a high performance liquid chromatography (HPLC) instrument, an ultra high performance liquid chromatography instrument (UPLC), Micro liquid chromatography, or Nano liquid chromatography.
20. The sample processing system of any one of subparagraphs 1-19, wherein the mass analyzer is a tandem mass spectrometer.
21. The sample processing system of subparagraph 20, wherein the tandem mass spectrometer is selected from the group consisting of a triple quadrupole, a quadrupole-linear ion trap, a quadrupole TOF, and a TOF-TOF.
22. The sample processing system of any one of subparagraphs 1-21, wherein the mass analyzer comprises a detector.
23. The sample processing system of subparagraph 22, wherein the detector is an ion detector.
24. The sample processing system of subparagraph 23, wherein the ion detector is selected from the group consisting of an electron multiplier, a Faraday cup, a photomultiplier conversion dynode detector, an array detector, and a charge detector.
25. The sample processing system of any one of subparagraphs 1-24, wherein the sample is a biological sample.
26. The sample processing system of subparagraph 25, wherein the biological sample is selected from the group consisting of urine, blood, oral fluid, plasma, tissue, bone marrow, and tumor samples.
27. The sample processing system of subparagraph 25 or subparagraph 26, wherein the biological sample is dissolved in a solvent, introduced into a solution, or mixed with a matrix material.
28. The sample processing system of any one of subparagraphs 1-27, wherein quantifying the at least one analyte present in the sample is based on a calibration curve generated for at least one calibration standard.
29. The sample processing system of subparagraph 28, wherein the calibration curve may be generated using at least one product ion transition, at least one isotopic ion transition, or a combination of both.
30. The sample processing system of any one of subparagraphs 1-29, wherein the sample processing system further comprises:

at least one sample preparation station configured to receive and/or prepare a sample; and at least one container, wherein the sample preparation station is configured to dispense the prepared sample into the at least one container.

31. The sample processing system of subparagraph 30, wherein the sample processing system further comprises:

at least one container transport device; sample introduction device is configured to receive the at least one container from the sample preparation station via the at least one container transport device.

32. The sample processing system of subparagraph 30 or subparagraph 31, wherein the sample processing system further comprises at least one aliquoting station, wherein the at least one aliquoting station is configured to aliquot a portion of the sample to and/or from the at least one container.
33. The sample processing system of subparagraph 32, wherein the at least one aliquoting station is housed in the sample preparation station or the at least one sample introduction device.

34. The sample processing system of subparagraph 32 or subparagraph 33, wherein the sample processing system comprises at least two aliquoting stations, wherein a first aliquoting station is housed in the sample preparation station and a second aliquoting station is housed in the at least one sample introduction device.

35. The sample processing system of any one subparagraphs 30-34, wherein the at least one container is at least one sample plate comprising a plurality of sample wells.

36. The sample processing system of subparagraph 35, wherein the sample well comprises the sample.

37. A sample processing system comprising:

at least one sample introduction device, wherein the at least one sample introduction device is configured to receive a sample;

a first mass analyzer coupled to the sample introduction device; wherein the first mass analyzer is configured to perform a first mass analysis of the sample, wherein the first mass analysis is a mass screening;

a second mass analyzer;

wherein if an analyte of interest is detected in the sample, the second mass analyzer is configured to perform a second mass analysis;

ionizing the sample;

monitoring, by mass spectrometry, at least one product ion transition for the at least one analyte and at least one isotopic ion transition for the at least one analyte;

determining the intensity and/or abundance of the at least one product ion transition and/or the at least one isotopic ion transition; and quantifying the at least one analyte present in the sample using the intensity and/or abundance of the product ion transition and/or isotopic ion transition;

and a control system configured to at least control the at least one sample introduction device, the first mass analyzer, and/or the second mass analyzer.

38. The sample processing system of subparagraph 37, wherein the product ion transition has an intensity and/or abundance of about 100%.

39. The sample processing system of subparagraph 38, wherein the product ion transition is the most intense and/or abundant isotope of the at least one analyte.

40. The sample processing system of any one of subparagraphs 37-39, wherein the intensity and/or abundance of the isotopic ion transition is less than about 100%, alternatively less than about 50%, alternatively less than about 25%, alternatively less than about 15%, alternatively less than about 10%, alternatively less than about 5% than a precursor and/or the product ion transition.

41. The sample processing system of any one of subparagraphs 37-40, wherein determining the intensity and/or abundance of the product ion transition and/or isotopic ion transition comprises obtaining mass data corresponding to the product ion transition and/or isotopic ion transition.

42. The sample processing system of any one of subparagraphs 37-41, wherein at least two analytes are quantified, alternatively at least three analytes are quantified, alternatively at least four analytes are quantified, alternatively at least five analytes are quantified, alternatively at least six analytes are quantified, alternatively at least seven analytes are quantified, alternatively at least eight analytes are quantified, alternatively at least nine analytes are quantified, alternatively at least ten analytes are quantified.

43. The sample processing system of any one of subparagraphs 37-42, wherein at least two product ion transitions are monitored, alternatively at least three product ion transitions are monitored, alternatively at least four product ion transitions are monitored, alternatively at least five product ion transitions are monitored, alternatively at least six product ion transitions are monitored, alternatively at least seven product ion transitions are monitored, alternatively at least eight product ion transitions are monitored, alternatively at least nine precursor-product ion transitions are monitored, alternatively at least ten precursor-product ion transitions are monitored.

44. The sample processing system of any one of subparagraphs 37-43, wherein at least two isotopic ion transitions are monitored, alternatively at least three isotopic ion transitions are monitored, alternatively at least four isotopic ion transitions are monitored, alternatively at least five isotopic ion transitions are monitored, alternatively at least six isotopic ion transitions are monitored, alternatively at least seven isotopic ion transitions are monitored, alternatively at least eight isotopic ion transitions are monitored, alternatively at least nine isotopic ion transitions are monitored, alternatively at least ten isotopic ion transitions are monitored.

45. The sample processing system of any one of subparagraphs 42-44, further comprising quantifying at least a second analyte in the sample using a product ion transition and/or isotopic ion transition of the second analyte.

46. The sample processing system of any one of subparagraphs 37-45, wherein the control system comprises a non-transitory and tangible computer-readable storage medium is used to determine the intensity and/or abundance of the isotopic ion transition.

47. The sample processing system of any one of subparagraphs 37-46, wherein if the product ion transition meets a condition, selecting the most intense and/or abundant isotopic ion transition that does not meet the condition, and quantifying the at least one analyte present in the sample using the intensity and/or abundance of said isotopic ion transition.

48. The sample processing system of subparagraph 47, wherein the condition is ionization saturation, detector saturation, product ions generated near the peak apex, peak shape, a threshold intensity and/or a threshold abundance.

49. The sample processing system of any one of subparagraphs 37-48, wherein quantifying the at least one analyte present in the sample comprises:

performing a separation step on the sample prior to ionization, using the intensity and/or abundance of the at least one product ion transition and/or the at least one isotopic ion transition to calculate a ratio of the at least one product ion transition and/or the at least one isotopic ion transition to the corresponding analyte and/or precursor, and quantifying the analyte in the sample using the calculated ratio.

50. The sample processing system of subparagraph 49, wherein the calculated ratio is used to calculate an isotopic dilution factor (IDF).

51. The sample processing system of subparagraph 50, wherein the IDF is used as a multiplier to compensate for abundance differences between the product ion transition and/or isotopic ion transition and the corresponding analyte.

52. The sample processing system of any one of subparagraphs 49-51, wherein the control system comprises a non-transitory and tangible computer-readable storage medium is used to calculate the ratio of the at least one product ion transition and/or isotopic ion transition to the corresponding analyte and/or the precursor, and/or quantifying the at least one analyte in the sample using the calculated ratio.

53. The sample processing system of any one of subparagraphs 37-52, wherein the sample introduction device comprises an acoustic droplet ejector (ADE), a solid phase extraction system, liquid-liquid extraction, protein precipitation, a liquid aspiration system, a microinjector, a nanoinjector, an inkjet printer nozzle, a chromatography instrument, microflow system, solid phase extraction system, differential mobility spectrometer, a trap-and-elute workflow, an open port interface, or direct flow injection.

54. The sample processing system of subparagraph 53, wherein the sample introduction comprises acoustically ejecting the liquid sample into a mobile phase at an open port interface (OPI) using the acoustic droplet ejector (ADE).

55. The sample processing system of subparagraph 53, wherein the chromatography instrument is a high performance liquid chromatography (HPLC) instrument, an ultra high performance liquid chromatography instrument (UPLC), Micro liquid chromatography, or Nano liquid chromatography.

56. The sample processing system of any one of subparagraphs 37-55, wherein the first mass analyzer is a single-stage mass spectrometer or a tandem mass spectrometer.

57. The sample processing system of subparagraph 56, wherein the single-stage mass spectrometer is selected from the group consisting of magnetic sector, quadrupole, time-of-flight (TOF), and ion traps.

58. The sample processing system of any one of subparagraphs 37-57, wherein the second mass analyzer is a tandem mass spectrometer.

59. The sample processing system of any one of subparagraphs 56-58, wherein the tandem mass spectrometer is selected from the group consisting of a triple quadrupole, a quadrupole-linear ion trap, a quadrupole TOF, and a TOF-TOF.

60. The sample processing system of any one subparagraphs 37-55, wherein the first and/or second mass analyzer comprises a detector.

61. The sample processing system of subparagraph 60, wherein the detector is an ion detector.

62. The sample processing system of subparagraph 61, wherein the ion detector is selected from the group consisting of an electron multiplier, a Faraday cup, a photomultiplier conversion dynode detector, an array detector, and a charge detector.

63. The sample processing system of any one subparagraphs 37-62, wherein the sample is a biological sample.

64. The sample processing system of subparagraph 63, wherein the biological sample is selected from the group consisting of urine, blood, oral fluid, plasma, tissue, bone marrow, and tumor samples.

65. The sample processing system of subparagraph 63 or subparagraph 64, wherein the biological sample is dissolved in a solvent, introduced into a solution, or mixed with a matrix material.

66. The sample processing system of any one subparagraphs 37-65, wherein quantifying the at least one analyte present in the sample is based on a calibration curve generated for at least one calibration standard.

67. The sample processing system of subparagraph 66, wherein the calibration curve may be generated using at least one product ion transition, at least one isotopic ion transition, or a combination of both.

68. The sample processing system of any one of subparagraphs 37-67, wherein the sample processing system further comprises:

at least one sample preparation station configured to receive and/or prepare a sample; and at least one container, wherein the sample preparation station is configured to dispense the prepared sample into the at least one container.

69. The sample processing system of subparagraph 68, wherein the sample processing system further comprises:

at least one container transport device; sample introduction device is configured to receive the at least one container from the sample preparation station via the at least one container transport device.

70. The sample processing system of subparagraph 68 or subparagraph 69, wherein the sample processing system further comprises at least one aliquoting station, wherein the at least one aliquoting station is configured to aliquot a portion of the sample to and/or from the at least one container.

71. The sample processing system of subparagraph 70, wherein the at least one aliquoting station is housed in the sample preparation station or the at least one sample introduction device.

72. The sample processing system of subparagraph 70 or subparagraph 71, wherein the sample processing system comprises at least two aliquoting stations, wherein a first aliquoting station is housed in the sample preparation station and a second aliquoting station is housed in the at least one sample introduction device.

73. The sample processing system of any one subparagraphs 68-72, wherein the at least one container is at least one sample plate comprising a plurality of sample wells.

74. The sample processing system of subparagraph 73, wherein the sample well comprises the sample.

75. A method for quantifying at least one analyte in a sample using a sample processing system, wherein the sample processing system comprises:

at least one sample introduction device, wherein the at least one sample introduction device is configured to receive a sample;

a mass analyzer coupled to the sample introduction device;

a control system configured to at least control the at least one sample introduction device and/or the mass analyzer, wherein the mass analyzer is configured to perform a first mass analysis on the sample, wherein the first mass analysis is mass screening for an analyte of interest in the sample, and wherein if the analyte of interest is detected in the sample, the mass analyzer is configured to perform a second mass analysis, wherein the second mass analysis is a quantitative analysis, comprising:

ionizing the sample;

monitoring, by mass spectrometry, at least one product ion transition for the at least one analyte and at least one isotopic ion transition for the at least one analyte;

determining the intensity and/or abundance of the at least one product ion transition and/or the at least one isotopic ion transition; and quantifying the at least one analyte present in the sample using the intensity and/or abundance of the product ion transition and/or isotopic ion transition.

76. The method of subparagraph 75, wherein the product ion transition has an intensity and/or abundance of about 100%.

77. The method of subparagraph 75 or subparagraph 76, wherein the product ion transition is the most intense and/or abundant isotope of the at least one analyte.

78. The method of any one of subparagraphs 75-77, wherein the intensity and/or abundance of the isotopic ion transition is less than about 100%, alternatively less than about 50%, alternatively less than about 25%, alternatively less than about 15%, alternatively less than about 10%, alternatively less than about 5% than a precursor and/or the product ion transition.

79. The method of any one of subparagraphs 75-78, wherein determining the intensity and/or abundance of the product ion transition and/or isotopic ion transition comprises obtaining mass data corresponding to the product ion transition and/or isotopic ion transition.

80. The method of any one of subparagraphs 75-79, wherein at least two analytes are quantified, alternatively at least three analytes are quantified, alternatively at least four analytes are quantified, alternatively at least five analytes are quantified, alternatively at least six analytes are quantified, alternatively at least seven analytes are quantified, alternatively at least eight analytes are quantified, alternatively at least nine analytes are quantified, alternatively at least ten analytes are quantified.

81. The method of any one of subparagraphs 75-80, wherein at least two product ion transitions are monitored, alternatively at least three product ion transitions are monitored, alternatively at least four product ion transitions are monitored, alternatively at least five product ion transitions are monitored, alternatively at least six product ion transitions are monitored, alternatively at least seven product ion transitions are monitored, alternatively at least eight product ion transitions are monitored, alternatively at least nine precursor-product ion transitions are monitored, alternatively at least ten precursor-product ion transitions are monitored.

82. The method of any one of subparagraphs 75-81, wherein at least two isotopic ion transitions are monitored, alternatively at least three isotopic ion transitions are monitored, alternatively at least four isotopic ion transitions are monitored, alternatively at least five isotopic ion transitions are monitored, alternatively at least six isotopic ion transitions are monitored, alternatively at least seven isotopic ion transitions are monitored, alternatively at least eight isotopic ion transitions are monitored, alternatively at least nine isotopic ion transitions are monitored, alternatively at least ten isotopic ion transitions are monitored.

83. The method of any one of subparagraphs 80-82, wherein the further comprising quantifying at least a second analyte in the sample using a product ion transition and/or isotopic ion transition of the second analyte.

84. The method of any one of subparagraphs 75-83, wherein the control system comprises a non-transitory and tangible computer-readable storage medium is used to determine the intensity and/or abundance of the isotopic ion transition.

85. The method of any one of subparagraphs 75-84, wherein if the product ion transition meets a condition, selecting the most intense and/or abundant isotopic ion transition that does not meet the condition, and quantifying the at least one analyte present in the sample using the intensity and/or abundance of said isotopic ion transition.

86. The method of subparagraph 85, wherein the condition is ionization saturation, detector saturation, product ions generated near a peak apex, peak shape, a threshold intensity and/or a threshold abundance.

87. The method of any one of subparagraphs 75-86, wherein quantifying the at least one analyte present in the sample comprises:

performing a separation step on the sample prior to ionization, using the intensity and/or abundance of the at least one product ion transition and/or the at least one isotopic ion transition to calculate a ratio of the at least one product ion transition and/or the at least one isotopic ion transition to the corresponding analyte and/or precursor, and quantifying the analyte in the sample using the calculated ratio.

88. The method of subparagraph 87, wherein the calculated ratio is used to calculate an isotopic dilution factor (IDF).

89. The method of subparagraph 88, wherein the IDF is used as a multiplier to compensate for abundance differences between the product ion transition and/or isotopic ion transition and the corresponding analyte.

90. The method of any one of subparagraphs 87-89, wherein the control system comprises a non-transitory and tangible computer-readable storage medium is used to calculate the ratio of the at least one product ion transition and/or isotopic ion transition to the corresponding analyte and/or the precursor, and/or quantifying the at least one analyte in the sample using the calculated ratio.

91. The method of any one of subparagraphs 75-90, wherein the sample introduction device comprises an acoustic droplet ejector (ADE), a solid phase extraction system, liquid-liquid extraction, protein precipitation, a liquid aspiration system, a microinjector, a nanoinjector, an inkjet printer nozzle, a chromatography instrument, microflow system, solid phase extraction system, differential mobility spectrometer, a trap-and-elute workflow, an open port interface, or direct flow injection.

92. The method of subparagraph 91, wherein the sample introduction comprises acoustically ejecting the liquid sample into a mobile phase at an open port interface (OPI) using the acoustic droplet ejector (ADE).

93. The method of subparagraph 92, wherein the chromatography instrument is a high performance liquid chromatography (HPLC) instrument, an ultra high performance liquid chromatography instrument (UPLC), Micro liquid chromatography, or Nano liquid chromatography.

94. The method of any one of subparagraphs 75-93, wherein the mass analyzer is a tandem mass spectrometer.

95. The method of subparagraph 94, wherein the tandem mass spectrometer is selected from the group consisting of a triple quadrupole, a quadrupole-linear ion trap, a quadrupole TOF, and a TOF-TOF.

96. The method of any one of subparagraphs 75-95, wherein the mass analyzer comprises a detector.

97. The method of subparagraph 96, wherein the detector is an ion detector.

98. The method of subparagraph 97, wherein the ion detector is selected from the group consisting of an electron multiplier, a Faraday cup, a photomultiplier conversion dynode detector, an array detector, and a charge detector.

99. The method of any one of subparagraphs 75-98, wherein the sample is a biological sample.

100. The method of subparagraph 99, wherein the biological sample is selected from the group consisting of urine, blood, oral fluid, plasma, tissue, bone marrow, and tumor samples.

101. The method of subparagraph 99 or subparagraph 100, wherein the biological sample is dissolved in a solvent, introduced into a solution, or mixed with a matrix material.

102. The method of any one of subparagraphs 75-101, wherein quantifying the at least one analyte present in the sample is based on a calibration curve generated for at least one calibration standard.

103. The method of subparagraph 102, wherein the calibration curve may be generated using at least one product ion transition, at least one isotopic ion transition, or a combination of both.

104. The method of any one of subparagraphs 75-103, wherein the sample processing system further comprises:

at least one sample preparation station configured to receive and/or prepare a sample; and at least one container, wherein the sample preparation station is configured to dispense the prepared sample into the at least one container.

105. The method of subparagraph 104, wherein the sample processing system further comprises:

at least one container transport device; sample introduction device is configured to receive the at least one container from the sample preparation station via the at least one container transport device.

106. The method of subparagraph 104 or subparagraph 105, wherein the sample processing system further comprises at least one aliquoting station, wherein the at least one aliquoting station is configured to aliquot a portion of the sample to and/or from the at least one container.

107. The method of subparagraph 106, wherein the at least one aliquoting station is housed in the sample preparation station or the at least one sample introduction device.

108. The method of subparagraph 106 or subparagraph 107, wherein the sample processing system comprises at least two aliquoting stations, wherein a first aliquoting station is housed in the sample preparation station and a second aliquoting station is housed in the at least one sample introduction device.

109. The sample processing system of any one subparagraphs 104-108, wherein the at least one container is at least one sample plate comprising a plurality of sample wells.

110. The sample processing system of subparagraph 109, wherein the sample well comprises the sample.

111. The method of any one of subparagraphs 75-110, wherein the method is used in a clinical analysis workflow.

112 The method of subparagraph 111, wherein the clinical analysis is used to screen for drugs of abuse or peptide markers for disease states.

113. The method of subparagraph 112, wherein the drugs of abuse are selected from the group consisting of amphetamines, methamphetamines, benzodiazepines, barbiturates, marijuana, cocaine, PCP, methadone, opioids (narcotics), fentanyl, norfentanyl, gabapentin, and pregabalin.

114. The method of any one of subparagraphs 75-113, wherein the method is used to extend the dynamic range of the mass analyzer.

115. The method of any one of subparagraphs 75-114, wherein the method prevents reanalysis of the sample and/or allows for selective dilution of several analytes.

While the present disclosure has been described with reference to certain aspects, it will be understood by those skilled in the art that various changes may be made and equivalents may be substituted without departing from the scope of the present disclosure or appended claims. In addition, many modifications may be made to adapt a particular situation or material to the teachings of the present disclosure without departing from its scope. Therefore, it is intended that the present disclosure not be limited to the particular aspects disclosed, but that the present disclosure will include all aspects falling within the scope of the appended claims.

All patents, patent applications, publications, and descriptions mentioned above are herein incorporated by reference in their entirety.

What is claimed is:

1. A sample processing system comprising:

at least one sample introduction device, wherein the at least one sample introduction device is configured to receive a sample;

a mass analyzer coupled to the sample introduction device;

a control system configured to at least control the at least one sample introduction device and/or the mass analyzer, wherein the mass analyzer is configured to perform a first mass analysis on the sample, wherein the first mass analysis is mass screening for an analyte of interest in the sample, and wherein if the analyte of interest is detected in the sample, the mass analyzer is configured to perform a second mass analysis, wherein the second mass analysis is a quantitative analysis, comprising:

ionizing the sample;

monitoring, by mass spectrometry, at least one product ion transition for the at least one analyte and at least one isotopic ion transition for the at least one analyte;

determining intensity and/or abundance of the at least one product ion transition and/or the at least one isotopic ion transition; and quantifying the at least one analyte present in the sample using the intensity and/or abundance of the at least one product ion transition and/or isotopic ion transition.

2. The sample processing system of claim 1, wherein the product ion transition has an intensity and/or abundance of about 100%.

3. The sample processing system of claim 1, wherein if the product ion transition meets a condition, selecting the most intense and/or abundant isotopic ion transition that does not meet the condition, and quantifying the at least one analyte present in the sample using the intensity and/or abundance of said isotopic ion transition.

4. The sample processing system of claim 3, wherein the condition is ionization saturation, detector saturation, product ions generated near a peak apex, peak shape, a threshold intensity and/or a threshold abundance.

5. The sample processing system of claim 1 wherein quantifying the at least one analyte present in the sample comprises:

performing a separation step on the sample prior to ionization, using the intensity and/or abundance of the at least one product ion transition and/or the at least one isotopic ion transition to calculate a ratio of the at least one product ion transition and/or the at least one isotopic ion transition to the corresponding analyte and/or precursor, and quantifying the analyte in the sample using the calculated ratio.

6. The sample processing system of claim 5, wherein the calculated ratio is used to calculate an isotopic dilution factor (IDF).

7. The sample processing system of claim 6, wherein the IDF is used as a multiplier to compensate for abundance differences between the product ion transition and/or isotopic ion transition and the corresponding analyte.

8. The sample processing system of claim 5, wherein the control system comprises a non-transitory and tangible computer-readable storage medium is used to calculate the ratio of the at least one product ion transition and/or isotopic ion transition to the corresponding analyte and/or the precursor, and/or quantifying the at least one analyte in the sample using the calculated ratio.

9. The sample processing system of claim 1, wherein the sample introduction device comprises an acoustic droplet ejector (ADE), a solid phase extraction system, liquid-liquid extraction, protein precipitation, a liquid aspiration system, a microinjector, a nanoinjector, an inkjet printer nozzle, a chromatography instrument, microflow system, solid phase extraction system, differential mobility spectrometer, a trap-and-elute workflow, an open port interface, or direct flow injection.

10. The sample processing system of claim 9, wherein the sample introduction comprises acoustically ejecting the liquid sample into a mobile phase at an open port interface (OPI) using the acoustic droplet ejector (ADE).

11. The sample processing system of claim 1, wherein the sample processing system further comprises:

at least one sample preparation station configured to receive and/or prepare a sample; and at least one container, wherein the sample preparation station is configured to dispense the prepared sample into the at least one container.

12. The sample processing system of claim 11, wherein the sample processing system further comprises:

at least one container transport device; sample introduction device is configured to receive the at least one container from the sample preparation station via the at least one container transport device.

13. The sample processing system of claim 11, wherein the sample processing system further comprises at least one aliquoting station, wherein the at least one aliquoting station is configured to aliquot a portion of the sample to and/or from the at least one container.

14. The sample processing system of claim 13, wherein the at least one aliquoting station is housed in the sample preparation station or the at least one sample introduction device.

15. The sample processing system of claim 13, wherein the sample processing system comprises at least two aliquoting stations, wherein a first aliquoting station is housed in the sample preparation station and a second aliquoting station is housed in the at least one sample introduction device.

16. The sample processing system of claim 11, wherein the at least one container is at least one sample plate comprising a plurality of sample wells.

17. The sample processing system of claim 16, wherein the sample well comprises the sample.

18. A method for quantifying at least one analyte in a sample using a sample processing system, wherein the sample processing system comprises:

at least one sample introduction device, wherein the at least one sample introduction device is configured to receive a sample;

a mass analyzer coupled to the sample introduction device;

a control system configured to at least control the at least one sample introduction device and/or the mass analyzer, wherein the mass analyzer is configured to perform a first mass analysis on the sample, wherein the first mass analysis is mass screening for an analyte of interest in the sample, and wherein if the analyte of interest is detected in the sample, the mass analyzer is configured to perform a second mass analysis, wherein the second mass analysis is a quantitative analysis, comprising:

ionizing the sample;

monitoring, by mass spectrometry, at least one product ion transition for the at least one analyte and at least one isotopic ion transition for the at least one analyte;

determining the intensity and/or abundance of the at least one product ion transition and/or the at least one isotopic ion transition; and quantifying the at least one analyte present in the sample using the intensity and/or abundance of the product ion transition and/or isotopic ion transition.

19. The method of claim 18, wherein the product ion transition has an intensity and/or abundance of about 100%.

20. The method of claim 18 wherein if the product ion transition meets a condition, selecting the most intense and/or abundant isotopic ion transition that does not meet the condition, and quantifying the at least one analyte present in the sample using the intensity and/or abundance of said isotopic ion transition.

* * * * *